United States Patent
Uehara et al.

(10) Patent No.: US 7,534,026 B2
(45) Date of Patent: May 19, 2009

(54) LIGHT SOURCE DEVICE, DISPLAY DEVICE, AND TERMINAL DEVICE

(75) Inventors: Shin-ichi Uehara, Tokyo (JP); Masao Imai, Tokyo (JP)

(73) Assignees: NEC Corporation, Tokyo (JP); NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 11/522,970

(22) Filed: Sep. 19, 2006

(65) Prior Publication Data

US 2007/0076434 A1 Apr. 5, 2007

(30) Foreign Application Priority Data

Sep. 30, 2005 (JP) .............................. 2005-288352

(51) Int. Cl.
*F21V 7/04* (2006.01)
*F21V 7/10* (2006.01)

(52) U.S. Cl. ........................ 362/613; 362/616; 362/620; 362/561; 349/65

(58) Field of Classification Search ................. 362/600, 362/606, 607, 611, 612, 613, 615, 616, 618, 362/619, 620, 632, 561; 649/65
See application file for complete search history.

(56) References Cited

U.S. PATENT DOCUMENTS

| | | | | |
|---|---|---|---|---|
| 5,313,225 A | * | 5/1994 | Miyadera | 345/102 |
| 5,396,350 A | * | 3/1995 | Beeson et al. | 349/62 |
| 5,956,107 A | * | 9/1999 | Hashimoto et al. | 349/64 |
| 6,151,008 A | * | 11/2000 | Zhang | 345/102 |
| 6,498,631 B2 | * | 12/2002 | Natsuyama | 349/62 |
| 6,648,486 B2 | * | 11/2003 | Harbers et al. | 362/613 |
| 6,943,770 B2 | * | 9/2005 | Garcia et al. | 345/102 |
| 2002/0163791 A1 | * | 11/2002 | Hoelen et al. | 362/31 |
| 2003/0063456 A1 | * | 4/2003 | Katahira | 362/27 |
| 2003/0184990 A1 | * | 10/2003 | Lin | 362/31 |
| 2004/0114396 A1 | * | 6/2004 | Kobayashi et al. | 362/561 |
| 2004/0135936 A1 | * | 7/2004 | Lee | 349/64 |
| 2005/0041180 A1 | * | 2/2005 | Ozawa | 349/98 |
| 2005/0099563 A1 | * | 5/2005 | Hsu et al. | 349/119 |
| 2005/0135115 A1 | * | 6/2005 | Lamb et al. | 362/613 |

FOREIGN PATENT DOCUMENTS

| | | |
|---|---|---|
| JP | 10-097199 A | 4/1998 |
| JP | 3271695 B | 1/2002 |

* cited by examiner

*Primary Examiner*—Ismael Negron
(74) *Attorney, Agent, or Firm*—Sughrue Mion, PLLC

(57) ABSTRACT

In a display device equipped with a light source device, a second light-guide member is provided to the back surface of a first light-guide member that has an emitted light control sheet provided to the front surface thereof. The emitted light control sheet is composed of a flat plate portion and protrusions. A first light source mounted to a side surface of the first light-guide member, and a second light source mounted to a side surface of a second light-guide member are switched and turned on. The emitted light control sheet has light-condensing effects when the first light source is on, and has diffusing effects when the second light source is turned on. The angle range of illuminating light can thereby be switched.

35 Claims, 21 Drawing Sheets

US 7,534,026 B2

LIGHT SOURCE DEVICE, DISPLAY DEVICE, AND TERMINAL DEVICE

BACKGROUND OF THE INVENTION

1. Field of the Invention

The present invention relates to a light source device capable of switching the angle range of illuminating light; to a display device capable of switching the angle range of visibility using this light source device; and to a terminal device equipped with this display device; wherein the light source device, display device, and terminal device have excellent directivity of light when the angle range of illuminating light is made narrow.

2. Description of the Related Art

Due to recent technological development, display panels are deployed and used in various locations in a range of devices that includes monitors, televisions, and other large terminal devices; notebook PCs, cash dispensers, vending machines, and other mid-sized terminal devices; and personal TVs, PDAs (Personal Digital Assistance), mobile phones, mobile gaming devices, and other small terminal devices. Because of their thin profile, light weight, small size, low energy consumption, and other advantages, display devices that use liquid crystals in particular are deployed in a large number of terminal devices.

The modes of liquid crystal panels most often used conventionally include an STN (Super Twisted Nematic) mode using a simple matrix structure, and a TN (Twisted Nematic) mode using an active matrix structure. However, liquid crystal panels that use these modes have a narrow angle range in which gradation can be correctly distinguished, and grayscale inversion occurs outside the optimum viewing position.

This problem of grayscale inversion was relatively insignificant in small-sized terminal devices whose display content consists mainly of text. However, with recent technological developments, mid-sized terminal devices as well as small-sized mobile terminal devices have come to display not only text information, but also large amounts of graphical information. Grayscale inversion has therefore become a significant problem. Liquid crystal panels that use a mode having a wide viewing angle range in which contrast can be correctly distinguished without the occurrence of grayscale inversion are therefore gradually being installed in small-sized mobile terminal devices. Liquid crystal panels having this type of mode are referred to generically as wide-angle-view liquid crystal panels, and horizontal field modes such as In-Plane Switching systems, multi-domain vertical alignment modes, and the like are implemented therein. Since gradation can be correctly distinguished over a wide viewing angle range by using these wide-angle-view liquid crystal panels, even though a mobile terminal device is basically a personal tool, applications for sharing information with others that can be appreciated by several people simultaneously are gradually being developed and installed.

Among these terminal devices, the nature of medium-sized terminal devices in particular is such that they are used not only in closed rooms under tight security, but also in public places. It then becomes necessary to have security measures to keep displays of private information and confidential information from being viewed by a third party. Particularly in recent years, occasions where private information and confidential information are displayed in mobile terminals have increased in conjunction with progress in terminal devices, and demand for techniques to prevent surreptitious viewing is increasing. Proposals have therefore been made of an optical member for preventing surreptitious viewing, and of a display device in which the range of visible display angles is narrowed so that the display is visible only to a user who is positioned in front of the display or in another specified direction, and the display cannot be viewed from other directions.

As described above, a display having a wide viewing angle range to allow viewing by several people simultaneously, and a display having a narrow viewing angle range that can be viewed only by the user, are both individually desirable, and the ability to switch between these two types of display in a single mobile terminal device is also desirable. A liquid crystal display device has therefore been proposed in order to satisfy such requirements.

FIG. 1 is a schematic sectional view showing a first conventional viewing-angle-controlled liquid crystal display device described in Japanese Patent No. 3271695. FIG. 2 is a perspective view showing the diffusing light-guide plate used in the backlight light source of this conventional example. In the first viewing-angle-controlled liquid crystal display device as shown in FIG. 1, a liquid crystal display element 5004 is provided, a polarizing plate 5012 is provided to the front surface and to the back surface of the liquid crystal display element 5004, and a backlight light source is provided to the back surface of the liquid crystal display element 5004. The backlight light source has a two-layer structure in which an ordinary backlight light source is layered with a backlight light source that has a diffusing light-guide plate 5001. Fluorescent tubes 5008 as light sources are provided to the surfaces on both sides of a light-guide plate 5009 in the ordinary backlight light source, a scattering sheet 5007 is provided to the front surface of the light-guide plate 5009, and a prism sheet 5006 for condensing light is furthermore provided to this front surface. Specifically, this ordinary backlight light source has exactly the same structure as a backlight light source in existence prior to filing of Japanese Patent No. 3271695, and is widely used.

The front surface of the prism sheet 5006 is also provided with an opaque slitted film 5005 that transmits light only in the frontal direction and has a visible angle range of about 10° to 20° in the horizontal direction. A diffusing light-guide plate 5001 is also provided to the front surface of the opaque slitted film 5005. Fluorescent tubes 5003 as light sources are provided to the surfaces on both sides of the diffusing light-guide plate 5001. As shown in FIG. 2, the diffusing light-guide plate 5001 is a transparent plate composed of acrylic resin, for example, and numerous minute indentations 5002 are formed on the surface thereof to create a satin finish overall. As shown in FIGS. 2 and 3, the minute indentations 5002 provided to the surface of the diffusing light-guide plate 5001 are cavities that have a wall 5002a that is perpendicular to the surface of the diffusing light-guide plate 5001.

In the first conventional viewing-angle-controlled display device thus configured as described in Japanese Patent No. 3271695, when the fluorescent tubes 5003 are OFF, and the fluorescent tubes 5008 are ON, the light emitted from the fluorescent tubes 5008 passes in sequence through the light-guide plate 5009, the scattering sheet 5007, and the prism sheet 5006. A portion of the light is cut off when passing through the opaque slitted film 5005, and the light becomes narrow-angle light that is visible at angles of 10° to 20° in the horizontal direction. This light undergoes virtually no scattering even when passing through the diffusing light-guide plate 5001 from directly below, and continues to pass through the liquid crystal display element 5004 as light whose angle of visibility in the horizontal direction is narrowed to about 40° to 50°. Therefore, light is propagated only in the frontal direction, which results in the inability to recognize an image viewed from outside the range of about 40° to 50° in the horizontal direction (narrow-angle state).

When the fluorescent tubes 5003 are ON, and the fluorescent tubes 5008 are OFF, since light is scattered by the indentations 5002 of the diffusing light-guide plate 5001, light passes through the liquid crystal display element 5004 in directions other than the frontal direction. As a result, it is possible to recognize an image viewed from a wide angle of 80° or higher in the horizontal direction (wide-angle state). It is thereby possible to switch the angle range of visibility.

However, the aforementioned conventional techniques have problems such as the following. Specifically, stray light occurs during the narrow-angle state, the luminance increases at large angles in the horizontal direction, and effects for preventing surreptitious viewing are adversely affected.

As shown in FIG. 1, in the viewing-angle-controlled display device described in Japanese Patent No. 3271695, a two-layer structure is adopted in which a backlight light source having a diffusing light-guide plate 5001 is layered on an ordinary backlight light source having an opaque slitted film 5005. The narrow-angle state is created when the backlight on the back side is turned on, i.e., when the ordinary backlight light source that has the opaque slitted film 5005 is turned on.

In the case of the narrow-angle state, light in a component perpendicularly incident on the diffusing light-guide plate, which is one of the angle components of light emitted from the opaque slitted film 5005, is emitted in the perpendicular direction without necessarily being scattered by the diffusing light-guide plate. However, components of light that are not perpendicularly incident on the diffusing light-guide plate, i.e., light that is even slightly tilted in relation to the light-incident surface, enters the perpendicular walls constituting the indentations.

FIG. 3 is a sectional view showing the diffusing light-guide plate, and the drawing shows in particular the operation observed when light is incident on a perpendicular wall constituting an indentation of the diffusing light-guide plate. As previously mentioned, a minute indentation 5002 is formed in the light-incident surface of the diffusing light-guide plate 5001, and this indentation 5002 is a cavity that has a wall 5002a perpendicular to the surface of the diffusing light-guide plate 5001. Light emitted from the opaque slitted film is narrow-angle light that is visible at angles of 10° to 20° in the horizontal direction, as previously described. The present description will focus on light propagated in a direction that is tilted 5° from the direction normal to the light-emitting surface. This light enters the diffusing light-guide plate 5001 at an angle that is tilted 5° from the direction of the line normal to the light-incident surface of the diffusing light-guide plate 5001. A portion of the light incident on the diffusing light-guide plate 5001 is also incident on the wall 5002a that constitutes the indentation 5002. This light that is incident on the perpendicular wall is incident on the diffusing light-guide plate 5001 at an angle tilted 85° from the direction of a line normal to the wall. It is apparent, based on Snell's Law, that the direction of advance of light that has entered the diffusing light-guide plate is tilted 41.6° from the direction of the line normal to the wall when the index of refraction of the diffusing light-guide plate is assumed to be 1.5. This angle is 48.4° as viewed from the direction of the line normal to the light-emitting surface of the diffusing light-guide plate. Specifically, light that enters the diffusing light-guide plate 5001 from the wall 5002a that is perpendicular to the surface of the indentation 5002 is incident at an angle of 48.4° on the light-emitting surface of the diffusing light-guide plate. Since this angle is larger than the total reflectance angle of 41.8° of the diffusing light-guide plate 5001, the light is totally reflected and is propagated through the diffusing light-guide plate 5001 without being emitted from the light-emitting surface. The light propagated through the diffusing light-guide plate 5001 produces the same effects as when the fluorescent tubes 5003 provided to the diffusing light-guide plate 5001 and used for the wide-angle state are ON. Specifically, even though the wide-angle light source is turned off, the effects that prevent surreptitious viewing are reduced due to the emission of components of light that have large angles, the same as when the wide-angle light source is turned on.

SUMMARY OF THE INVENTION

An object of the present invention is to provide a light source device capable of switching the angle range of illuminating light, a display device capable of switching the angle range of visibility using this light source device, and a terminal device equipped with this display device, wherein the light source device, display device, and terminal device have excellent directivity of light when the angle range of illuminating light is made narrow.

The light source device according to the present invention comprises first and second light sources, a first light-guide member on which light from the first light source is incident, a second light-guide member on which light from the second light source is incident, and an emitted light control sheet on which light emitted from the first and second light-guide members is incident and which controls an emission direction of emitted light; wherein the emitted light control sheet is composed of a transparent material and has a flat plate portion and protrusions formed on a surface of the flat plate portion on the side facing the first light-guide member, apexes of the protrusions are closely contacted to the first light-guide member, and the second light-guide member is disposed on the opposite side of the first light-guide member in relation to the side on which the emitted light control sheet is mounted.

In the present invention, when the first light source is turned on, the light emitted from this first light source propagates through the first light-guide member and exits with high directivity from the emitted light control sheet. When the second light source is turned on, the light emitted from this second light source is propagated through the second light-guide member and emitted in a scattered state from the emitted light control sheet. Since the emitted light control sheet has light-condensing effects or light-diffusing effects according to the angle at which light is emitted from the light-guide member, the angle range of illuminating light can be switched by alternately switching on the first and second light sources. The first light-guide member and the emitted light control sheet are disposed on the top surface of the light source device, and the first light-guide member and the emitted light control sheet emit light that radiates in a narrow angle range. Therefore, the high-directivity light emitted from the first light-guide member and the emitted light control sheet is not scattered by other structural elements of the light source device. Excellent directivity can thereby be realized, particularly when the angle range of illuminating light is narrow.

The first light-guide member may be a parallel flat plate, for example. Light is thereby output from the apexes of the protrusions on the emitted light control sheet that are adjacent to the narrow-angle light-guide member. Therefore, in contrast with the wide-angle second light-guide member that has a tilted surface, there is no light emitted towards the back surface of the first light-guide member. Excellent directivity can thereby be realized, particularly when the angle range of illuminating light is narrow.

A tilted surface irradiated by light that is incident from the second light source may be formed in the second light-guide member. Light is thereby emitted in a wide angle range from the second light-guide member, and this light is furthermore scattered by the emitted light control sheet. The light can therefore be emitted in a wide angle range.

Furthermore, the first light source may be disposed on a first side surface of the first light-guide member, and a reflecting panel may be mounted to a second side surface of the first light-guide member on an opposite side from the first side surface. This configuration makes it possible to increase luminance without compromising the directivity of emitted light when the first light source is on.

The first light source may also be a point light source mounted to a side surface of the first light-guide member, and a reflecting panel may be mounted outside a region in which the point light source is mounted on the side surface. This configuration enables even further increased luminance.

Furthermore, a reflecting panel may be mounted on a side of the second light-guide member that is opposite a surface to which the first light-guide member is mounted. Light that is emitted towards the reflecting panel from the second light-guide member can thereby be reflected in the frontal direction, and the luminance can be enhanced when the second light source is on.

The first light source and the second light source may be mounted to side surfaces on the same sides as the first light-guide member and the second light-guide member, respectively. The bottom surface area of the light source device can thereby be reduced in comparison to a case in which the first light source and the second light source are each disposed in different positions from the light-guide plates thereof.

The position of the first light source in relation to the first light-guide member may differ from the position of the second light source in relation to the second light-guide member. Compared to a case in which the light sources are stacked, this configuration makes it possible to reduce the effect of the thickness of the light source on the overall thickness, and to create a thin-profile device. Since the first light source and the second light source are not disposed in proximity to each other, heat is easily dissipated from the light source unit, and a temperature increase in the light source unit can be suppressed.

The first light source may be mounted to a corner of the first light-guide member. Uniformity can thereby be obtained within the emission plane of the light source device, compared to a case in which a point light source is provided to a side surface of the light-guide plate.

An imaginary straight line that connects apexes of the protrusions may also extend in three different directions that are parallel to a surface of the flat plate portion. Moiré is thereby prevented from occurring with the display panel when the light source device illuminates the display panel.

An imaginary straight line that connects apexes of the protrusions may also form an equilateral triangle, for example. The light emitted from the light-guide member can thereby be more efficiently condensed in the frontal direction when the first light source is on.

A diffusion pattern for diffusing transmitted light may be formed on a surface opposite from the side on which the protrusions are formed in the flat plate portion of the emitted light control sheet. Moiré is thereby prevented from occurring with the display panel when the light source device illuminates the display panel.

Furthermore, an intensity of the first light source may be smaller than an intensity of the second light source. When the first light source is on, since light that is incident from the first light source is condensed and emitted in a narrow angle range, the luminance does not decrease even when the intensity of the first light source is smaller than the intensity of the second light source. Power consumption can therefore be reduced.

The first light source may also be composed of one or a plurality of point light sources, the second light source may be composed of a plurality of point light sources, and a number of point light sources that constitute the first light source may be smaller than a number of point light sources that constitute the second light source. When the first light source is on, since light that is incident from the first light source is condensed and emitted in a narrow angle range, the luminance does not decrease even when the number of point light sources that constitute the first light source is smaller than the number of point light sources that constitute the second light source. This configuration enables both reduced power consumption and reduced cost.

The first light source may also be on when the second light source is on. This configuration makes it possible to enhance the luminance in the frontal direction during illumination in a wide angle range.

A size of the first light-guide member may also be greater than a size of the second light-guide member. This configuration makes it possible to prevent light emitted from an end surface of the first light-guide member from entering the second light-guide member and being reduced in directivity.

An opaque sheet may also be mounted between the first light-guide member and the second light-guide member. This configuration makes it possible to prevent light emitted from an end surface of the first light-guide member from scattering, entering the second light-guide member, and being reduced in directivity.

It is also possible to utilize an opaque sheet that has adhesive properties. The first light-guide member and the second light-guide member can thereby be fixed together.

The light source device may also be housed in a holder and mounted so that the holder has light-absorbing properties. The holder may also be black. This configuration makes it possible to prevent light emitted from an end surface of the first light-guide member from being scattered by the holder or another component, entering the second light-guide member, and being reduced in directivity.

The display device according to the present invention comprises the light source device, and a transmissive display panel for transmitting light emitted from the light source device, whereby an image is associated with the light.

In the present invention, since the angle range of illuminating light is switched by the light source device, the viewing angle of the display device can be switched. In the display device of the present invention, a display panel may be used that has a transmissive display region in each pixel. Particularly when a wide-angle liquid crystal display panel is used, there is no grayscale inversion that is dependent on the viewing angle when the wide-angle light source is on, and visibility can be enhanced.

The transmissive display panel may be a transmissive liquid crystal panel, and the transmissive liquid crystal panel may be a horizontal field mode, multi-domain vertical alignment mode, or film-compensated TN mode liquid crystal panel, for example.

Furthermore, the transmissive display panel and the emitted light control sheet of the light source device may be closely contacted together. The transmissive liquid crystal panel may also have a polarizing plate on at least a surface facing the light source device, and the polarizing plate may be a low-reflectance polarizing plate whose surface is treated to reduce reflectance. It is thereby possible to prevent directivity from being reduced by surface reflection of the transmissive display panel or transmissive liquid crystal panel.

Furthermore, the transmissive liquid crystal panel may have a polarizing plate on at least a surface facing the light source device, and the polarizing plate may be a circular polarizing plate. This configuration makes it possible to reduce the amount of light reflected by reflecting structures of the transmissive liquid crystal panel, and to prevent a reduction in directivity. This configuration is particularly effective when the transmissive liquid crystal panel is an active matrix, because of the resultant large number of reflecting structures.

Furthermore, when the transmissive liquid crystal panel is a transflective liquid crystal panel having a reflective region in a pixel electrode, the amount of light reflected by the reflective region of a pixel electrode can be reduced. This configuration is therefore effective for preventing a reduction in directivity.

The terminal device according to the present invention comprises the display device.

The terminal device may be a mobile phone, a personal information terminal, a gaming device, a digital camera, a video camera, a video player, a notebook-type personal computer, a cash dispenser, or a vending machine.

When the terminal device is a mobile telephone, it is preferred that the first and second light sources be disposed on the top side and/or bottom side of a display screen. By this configuration, there is no need to maintain a space for placement of the light source to the left and right of the display screen, and a slim chassis and large screen can be obtained at the same time.

The terminal device may also comprise an intensity adjustment unit for adjusting intensities of the first and second light sources independently from each other. A user can thereby set an optimum viewing angle according to the operating environment.

The terminal device according to the present invention comprises a power storage unit for supplying electrical power to at least the first and second light sources, a residual power detection unit for detecting electrical power remaining in the power storage unit, and a control unit for controlling a light intensity of the first and second light sources based on results of detection by the residual power detection unit, wherein the control unit turns on only the first light source when the remaining electrical power detected by the residual power detection unit is less than a prescribed value. This configuration allows less power to be consumed during narrow-angle display than during wide-angle display. Power consumption can therefore be reduced by automatically switching to narrow-angle display when the remaining battery power is low, and the operating time of the terminal device can be extended.

The terminal device according to the present invention comprises an input detection unit for detecting an input operation, a timer for measuring a specific time, and a control unit for controlling a light intensity of the first and second light sources, wherein the control unit turns on only the first light source when the input detection unit has not detected an input operation during the specific time measured by the timer. Power consumption can therefore be reduced by switching to narrow-angle display when the terminal device is in an input standby state, and the operating time of the terminal device can be extended.

BRIEF DESCRIPTION OF THE DRAWINGS

FIG. 7 is an optical model diagram showing the behavior of light when the narrow-angle light source is turned on;

FIG. 8 is a partial enlarged sectional view showing the behavior of light near a protrusion provided to the emitted light control sheet when the narrow-angle light source is turned on;

FIG. 10 is an optical model diagram showing the behavior of light when the wide-angle light source is turned on;

DESCRIPTION OF THE PREFERRED EMBODIMENTS

Figure 1:
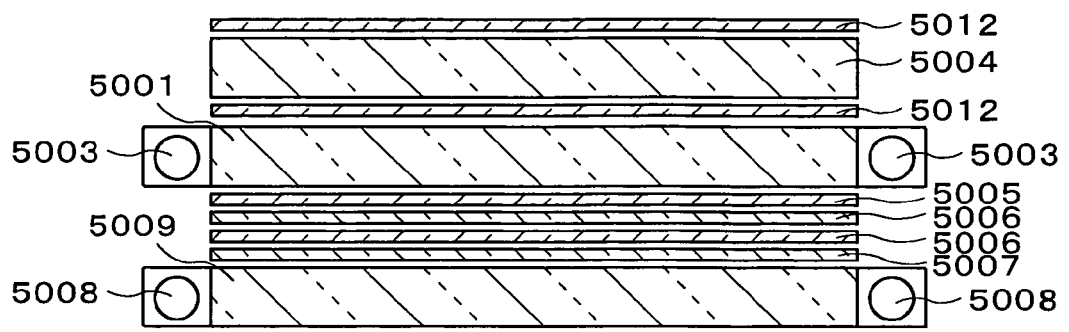
FIG. 1 is a sectional view showing the viewing-angle-controlled display device disclosed in Japanese Patent No. 3271695.
Figure 2:
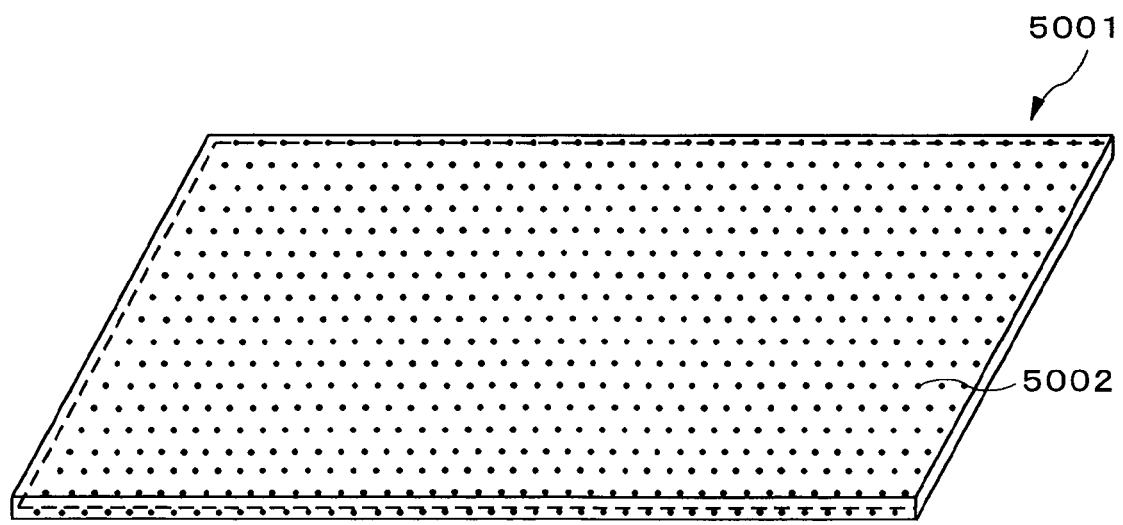
FIG. 2 is a perspective view showing the diffusing light-guide plate in the viewing-angle-controlled display device disclosed in Japanese Patent No. 3271695.
Figure 3:
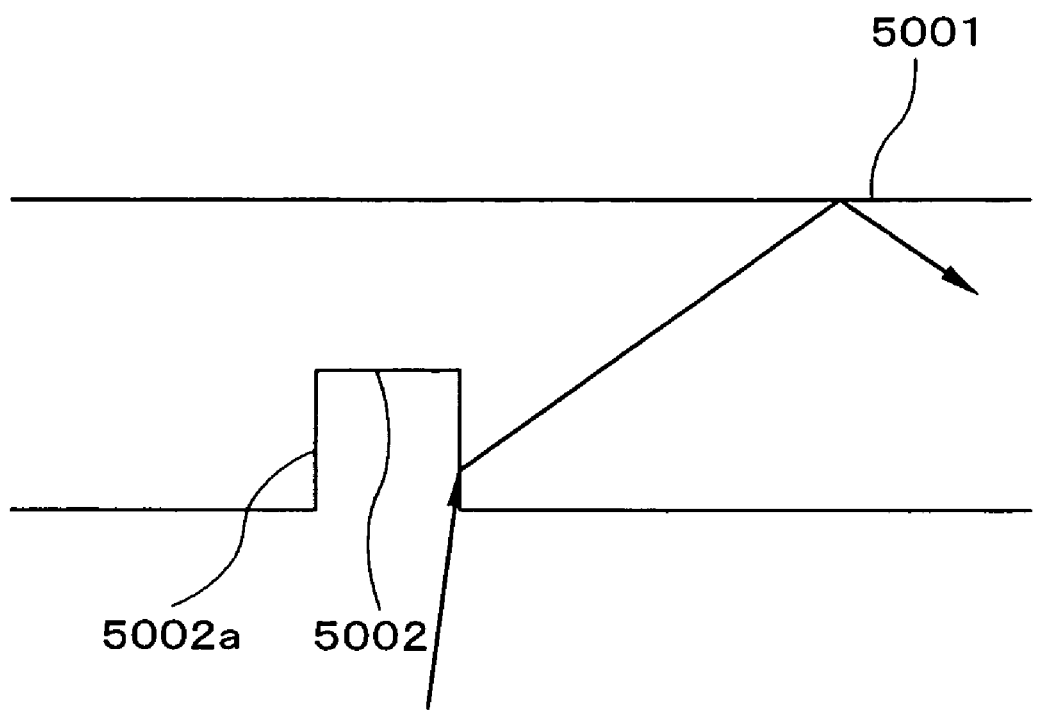
FIG. 3 is a sectional view showing the operation when light is incident on a perpendicular wall that constitutes an indentation of the diffusing light-guide plate in the diffusing light-guide plate in the viewing-angle-controlled display device disclosed in Japanese Patent No. 3271695.
Figure 4:
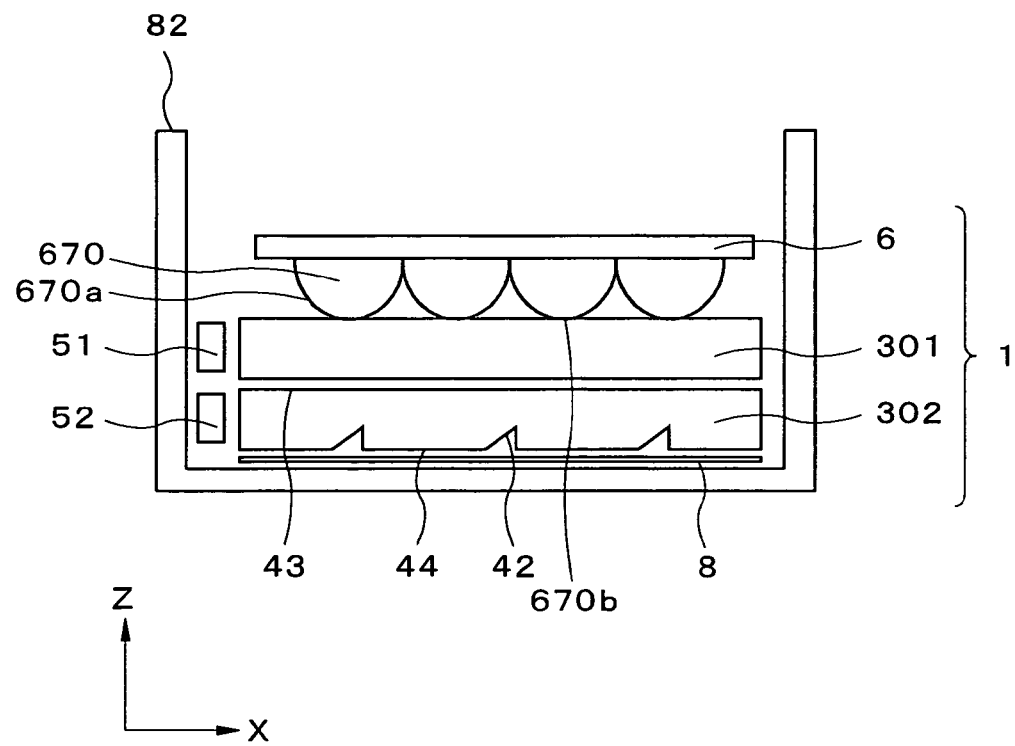
FIG. 4 is a sectional view showing the light source device according to a first embodiment of the present invention.
Figure 5:
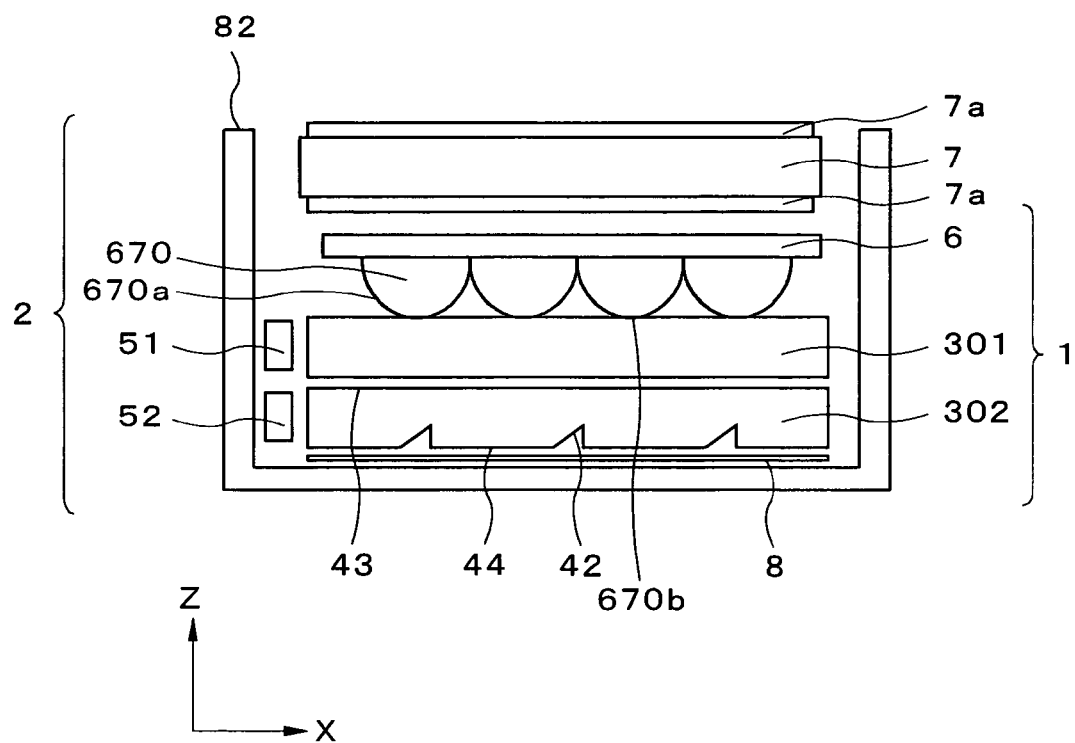
FIG. 5 is a sectional view showing display device that is equipped with the light source device according to a first embodiment of the present invention.
Figure 6:
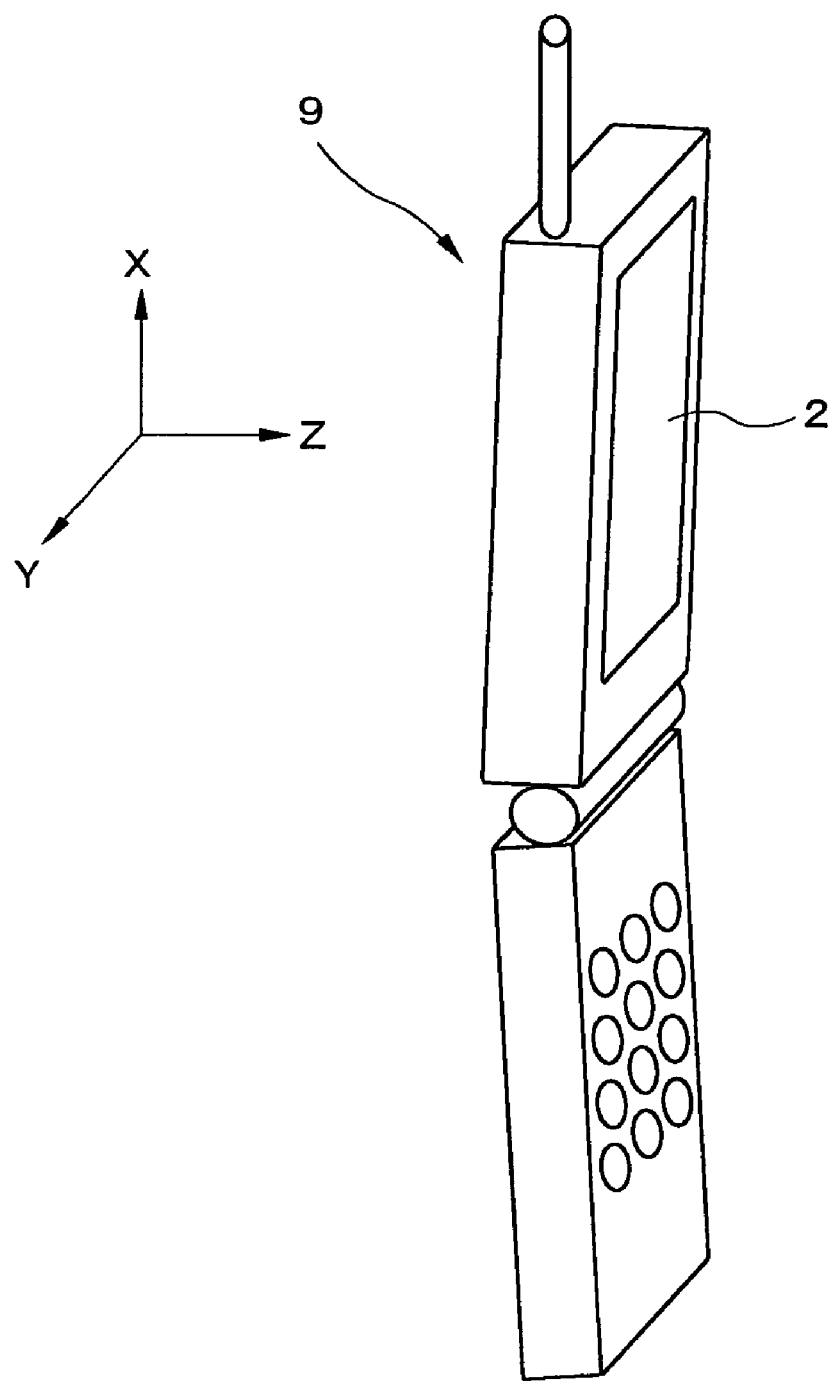
FIG. 6 is a perspective view showing a mobile terminal device that is equipped with a display device that uses the light source device according to a first embodiment of the present invention.

The light source device, display device that uses the light source device, and terminal device according to embodiments of the present invention will be described in detail hereinafter with reference to the accompanying drawings. The light source device, display device that uses the light source device, and terminal device according to a first embodiment of the present invention will first be described. FIG. 4 is a sectional view showing the light source device according to the present embodiment; FIG. 5 is a sectional view showing the display device that uses the light source device; and FIG. 6 is a perspective view showing a mobile terminal device that is equipped with the display device that uses the light source device of the present embodiment.

As shown in FIG. 4, a light-guide plate 301, an emitted light control sheet 6 disposed facing the front surface of the light-guide plate 301, i.e., towards an observer; a second light-guide plate 302 disposed facing the back surface of the light-guide plate 301, and light sources 51 and 52 disposed facing the side surfaces of the two light-guide plates 301, 302 are provided in the light source device 1 according to the present first embodiment. A reflecting panel 8 is provided facing the back surface of the light-guide plate 302. Protrusions 670 are formed on the surface of the emitted light control sheet 6 that faces the light-guide plate 301. The front surface of the second light-guide plate 302, i.e., the surface that faces the light-guide plate 301, is a light-emitting surface 43, and the surface that is opposite the surface facing the light-guide plate 301, i.e., the back surface thereof, is a light-diffusing surface 44. The light-emitting surface 43 is flat. Tilted surfaces 42 are formed in the light-diffusing surface 44. Furthermore, a holder 82 is provided for retaining the structure of the light source device 1, i.e., the light-guide plates 301, 302, the light sources 51, 52, and the emitted light control sheet 6. The light source 51 is a narrow-angle light source, and the light source 52 is a wide-angle light source. The light-guide plate 301 is a narrow-angle light-guide plate, and the light-guide plate 302 is a wide-angle light-guide plate.

An XYZ orthogonal coordinate system is set up as described below for convenience in the present specification. The direction from the light source 51 to the light-guide plate 301 is the +X direction, and the opposite direction is the −X direction. The +X direction and the −X direction are collectively referred to as the X-axis direction. Within the direction parallel to the light-emitting surface 43 of the light-guide plate 302, the direction orthogonal to the X-axis direction is the Y-axis direction. Furthermore, the direction that is orthogonal to both the X-axis direction and the Y-axis direction is the Z-axis direction. Within the Z-axis direction, the direction from the light-diffusing surface 44 to the light-emitting surface 43 is the +Z direction, and the opposite direction is the −Z direction. The +Z direction is the frontal direction, i.e., the direction towards the observer. The +Y direction is the direction in which a right-handed coordinate system is established. Specifically, when the person's right thumb is in the +X direction, and the index finger is in the +Y direction, the middle finger is in the +Z direction.

As described above, when the XYZ orthogonal coordinate system is set up, the light-emitting surface 43 of the light-guide plate 302 becomes the XY plane, the light-guide plate 301 is disposed in the +Z direction of the light-guide plate 302, and the emitted light control sheet 6 is disposed in the +Z direction of the light-guide plate 301. The light source 51 is disposed in the −X direction as viewed from the light-guide plate 301, and the light source 52 is also disposed in the same manner in the −X direction as viewed from the light-guide plate 302. The light sources 51 and 52 are diffuse light sources, and the light emitted from the light source 51 is diffused at least in the XY direction inside the light-guide plate 301. The light emitted from the light source 52 is also diffused in the same manner at least in the XY direction inside the light-guide plate 302.

As previously mentioned, protrusions 670 are formed on the surface of the emitted light control sheet 6 that faces the light-guide plate 301, and the protrusions 670 protrude in the −Z direction, i.e., towards the light-guide plate 301. The shape of the protrusions 670 includes a portion of a sphere or elliptical sphere, and the apexes 670b thereof are optically contacted to the surface of the light-guide plate 301 on the +Z side. The side surfaces that extend from the apexes 670b of the protrusions 670 to the base form reflecting surfaces 670a whereby light that enters into the protrusions 670 through the apexes 670b from the surface on the +Z side of the light-guide plate 301 is reflected towards the frontal direction (+Z direction). Furthermore, a circular cross-sectional shape is formed when the reflecting surfaces 670a are cut in the XY plane.

Figure 34:
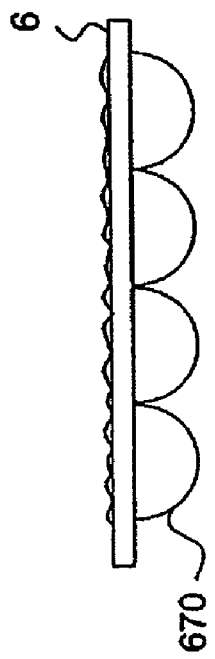
FIG. 34 is a perspective view showing the light diffusion pattern.
Figure 33:
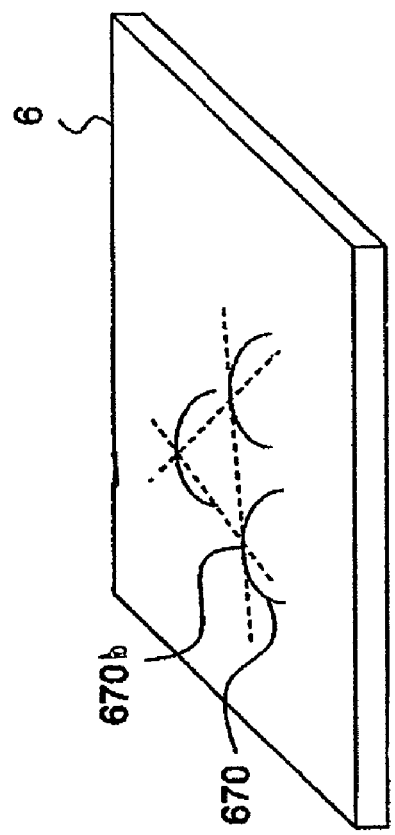
FIG. 33 is a perspective view showing imaginary straight lines that connect apexes of the protrusions on the emitted light control sheet.
Figure 35:
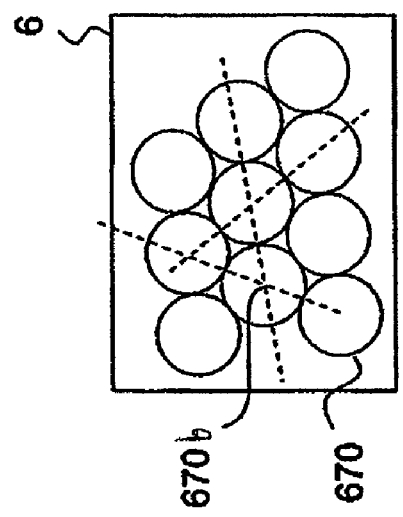
FIG. 35 is a perspective view showing imaginary straight lines that connect apexes of the protrusions on the emitted light control sheet.

Also shown in FIGS. 33, 34, and 35, the apexes 670b of the protrusions 670 are arranged in two directions that are tilted 60 degrees with respect to the X-axis direction and the X-axis direction within the XY plane. Specifically, the extension direction of an imaginary straight line that connects the apexes 670b makes a total of thee directions that include the X-axis direction and two directions that are tilted 60 degrees with respect to the X-axis direction in the XY plane. By this configuration, when thee mutually adjacent apexes 670b are connected, an imaginary equilateral triangle is formed having one side that extends in the Y-axis direction.

In an example, the apexes 670b of the protrusions 670 are arranged at an equal pitch in the Y-axis direction with an interval of 40 μm, and the side of the equilateral triangle formed by the apexes 670b is 40 μm in length. The protrusions 670 are spheroid portions, and 37 μm of the distal ends of spheroids having a width of 30 μm in the X-axis direction, a width of 30 μm in the Y-axis direction, and a height of 200 μm in the Z-axis direction protrude from the emitted light control sheet 6. A transparent resin is appropriate for use as the material of the emitted light control sheet 6 due to its easy workability, and polymethyl methacrylate (PMMA) having a refractive index of 1.5 is used in the present embodiment.

Tilted surfaces 42 are repeatedly arranged in the light-diffusing surface 44 of the light-guide plate 302. The tilted surfaces 42 are tilted in the radiation direction of light that is emitted from the light source 52 and transmitted in the +X direction through the light-guide plate 302. The absolute value of the tilt angle of the tilted surfaces 42 is 45 degrees, for example. The tilted surfaces 42 extend in the Y-axis direction along the entire length of the light-guide plate 302.

As shown in FIG. 5, in a display device 2 that uses the light source device 1 according to the present first embodiment, a transmissive liquid crystal panel 7 is provided to the opposite side, i.e., the side in the +Z direction, from the side on which the light-guide plate 301 of the emitted light control sheet 6 is disposed. The transmissive liquid crystal panel 7 is a horizontal field mode, multi-domain vertical alignment mode, or film-compensated TN mode liquid crystal panel, for example. The transmissive liquid crystal panel 7 has polarizing plates 7a on the −Z direction side and the +Z direction side.

As shown in FIG. 6, the display device 2 is installed in a mobile telephone 9, for example. The display device 2 is arranged so that the transverse direction and the longitudinal direction of the mobile telephone 9 correspond to the Y-axis direction and the X-axis direction, respectively, of the light source device. Specifically, the two light sources 51 and 52 in the mobile telephone 9 (see FIG. 5) are disposed on the bottom side of the display screen.

Figure 7:
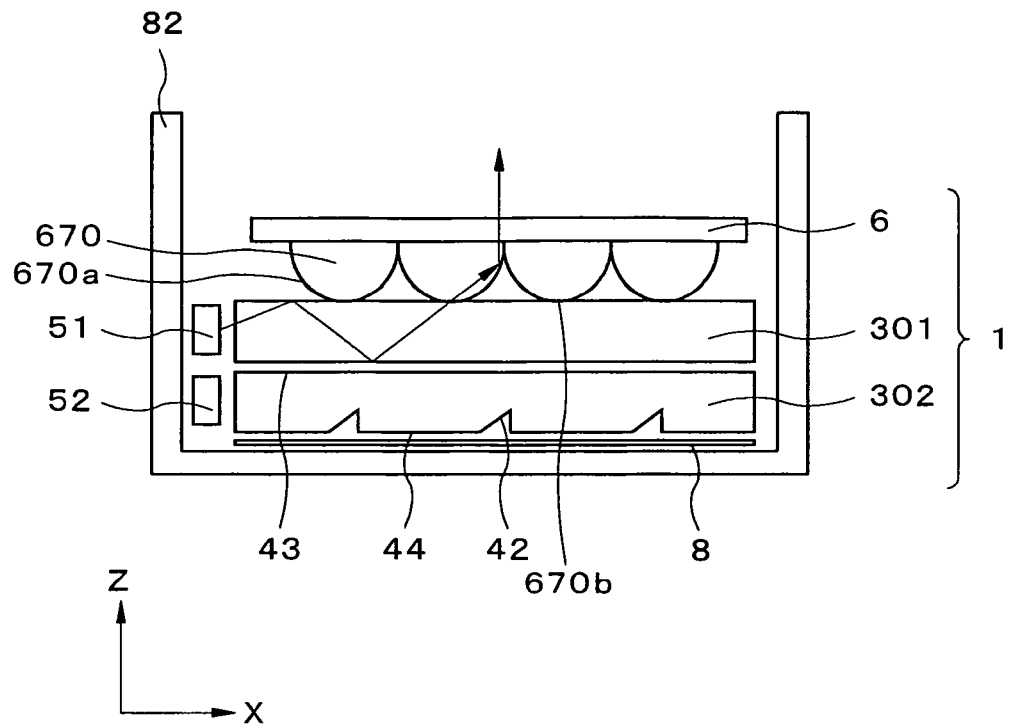
Figure 8:
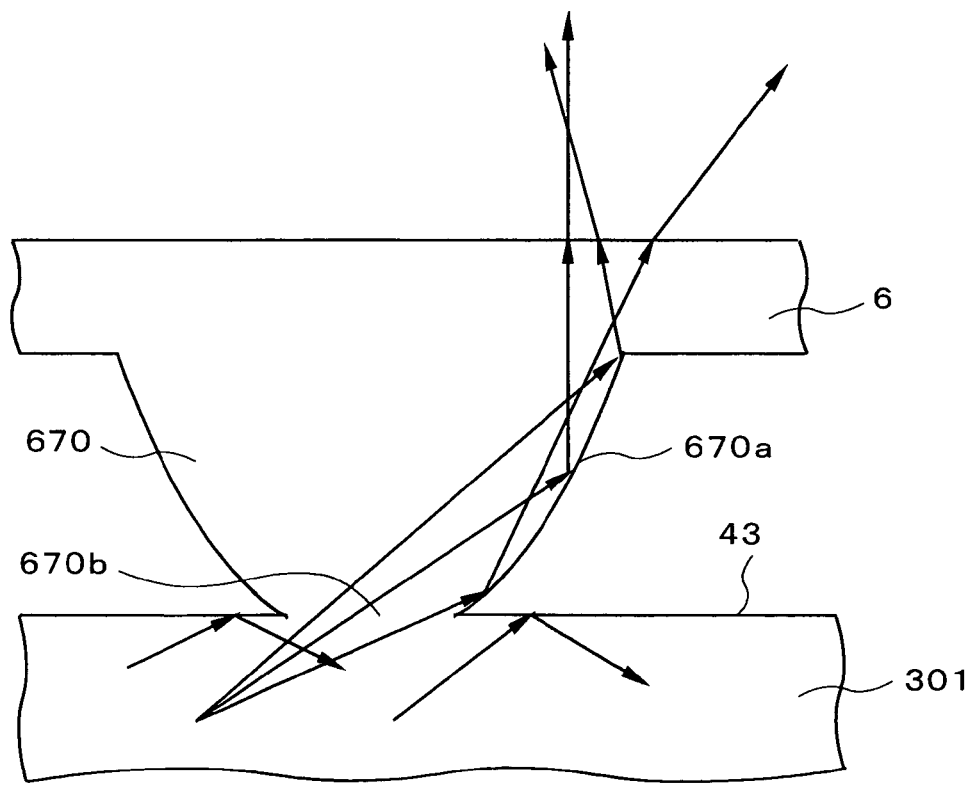
Figure 9:
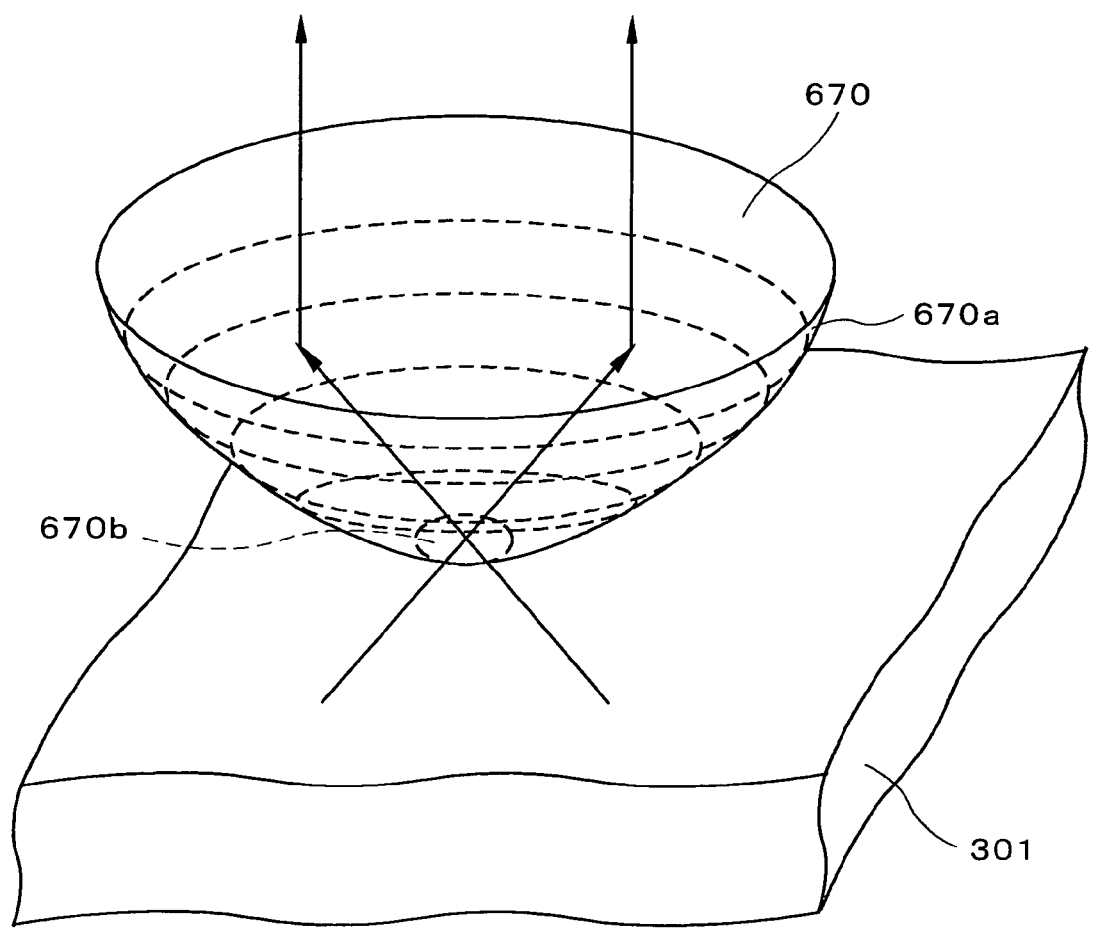
FIG. 9 is a perspective view showing a protrusion provided to the emitted light control sheet.
Figure 10:
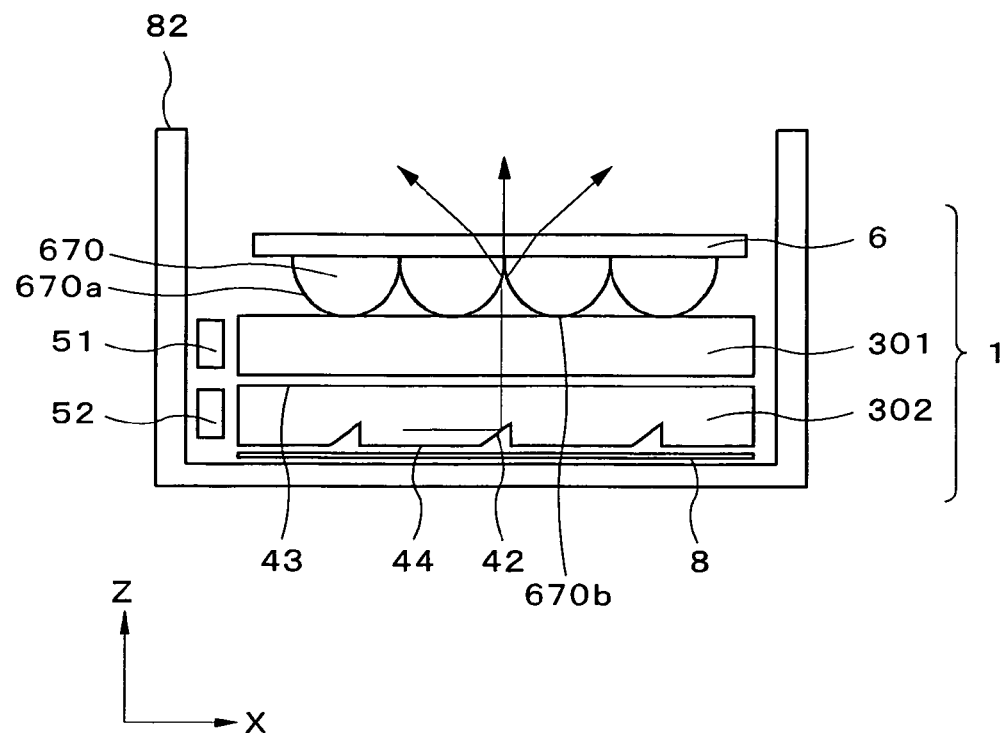

The operation of the light source device 1 of the present embodiment configured as described above will next be described. Specifically, the method of switching the angle range of illuminating light in the light source device 1 will next be described. The operation performed when the illumination range of the light source device 1 is narrowed will first be described. FIG. 7 is an optical model diagram showing the behavior of light when the narrow-angle light source is turned on; FIG. 8 is a partial enlarged sectional view showing the behavior of light near a protrusion when the narrow-angle light source is turned on; FIG. 9 is a perspective view showing a protrusion; and FIG. 10 is an optical model diagram showing the behavior of light when the wide-angle light source is turned on.

A case in which the narrow-angle light source is on will first be described. As shown in FIG. 7, the light emitted by the narrow-angle light source 51 is incident on the light-guide plate 301, but due to the difference in refractive index between the air and the resin material of the light-guide plate 301, the angle formed in the Z-axis direction by the +X direction and the direction in which the light is propagated after entering the light-guide plate 301 is smaller than 41.8 degrees based on Snell's law. Therefore, light rays will be considered that are tilted 41.8 degrees in the +Z direction with respect to the +X direction.

As shown in FIG. 7, light rays emitted from the narrow-angle light source 51 and directed to the light-guide plate 301 reach the surface on the +Z side of the light-guide plate 301. Since the incidence angle with respect to this surface on the +Z side is 48.2 degrees from the Z-axis direction, which is larger than the critical angle of 41.8 degrees, the light rays undergo total reflection without exiting from the light-guide plate 301. In the same manner, since total reflection also occurs in the surface on the −Z side of the light-guide plate 301 at the same angle, the light rays are propagated away from the light source 51 while undergoing repeated total reflection between the surface on the +Z side and the surface on the −Z side. Specifically, when the light propagated through the light-guide plate 301 is radiated to regions that are not adjacent to the apexes 670b of the protrusions 670 of the emitted light control sheet 6 on the +Z side of the light-guide plate 301, the light undergoes total reflection in the surface on the +Z side, and continues to be propagated in the light-guide plate 301. As shown in FIGS. 7 and 8, when the light propagated in the light-guide plate 301 is radiated to regions that are adjacent to the apexes 670b in the surface on the +Z side of the light-guide plate 301, the light is guided into the protrusions 670 via the apexes 670b, is reflected by the reflecting surfaces 670a that are the inner surfaces of the protrusions 670, and is emitted in directions near the +Z direction. Reflection in the reflecting surfaces 670a is total reflection that utilizes the difference in refractive index between the protrusions 670 and the atmosphere.

In this case, as shown in FIG. 9, since the reflecting surfaces 670a of the protrusions 670 are curved and have an arcuate cross-sectional shape in the XY plane, the reflecting surfaces 670a can reflect in nearly the same direction, i.e., the +Z direction, the light rays shown in FIG. 7 that are emitted from positions that are separated from each other in the light source 51. The emission characteristics of the light source device therefore have strong directivity in the frontal direction when the narrow-angle light source 51 is on, and the illumination range is limited to a narrow angle range.

The operation performed when the illumination range of the light source device 1 is widened will next be described. FIG. 10 is an optical model diagram showing the behavior of light when the wide-angle light source is turned on, and shows a case in which the light source 52 that is the wide-angle light source is on. As shown in FIG. 10, the light emitted by the wide-angle light source 52 is incident on the light-guide plate 302 and is propagated through the light-guide plate 302. This aspect is the same as in the operation of the narrow-angle light-guide plate 301 when the narrow-angle light source 51 is on as previously described. However, the present operation differs in that tilted surfaces 42 having a tilt angle of 45 degrees are provided to the wide-angle light-guide plate 302. Specifically, the light that enters the light-guide plate 302 is propagated in the +X direction through the light-guide plate 302 and emitted to the tilted surfaces 42. In order to describe the operation of the tilted surfaces 42 whose tilt angle is 45 degrees, light will first be considered that is propagated through the light-guide plate 302 in the +X direction and is incident on the tilted surfaces 42. Since the incidence angle of this light with respect to the tilted surfaces 42 is 45 degrees, which is larger than the critical angle of 41.8 degrees, the light entering the tilted surfaces 42 undergoes total reflection without exiting from the light-guide plate 302. The direction of advance after total reflection is the +Z direction.

The light emitted in the +Z direction from the light-guide plate 302 passes through the light-guide plate 301 and enters the emitted light control sheet 6. This light is then refracted in the reflecting surfaces 670a of the protrusions 670 and scattered in various directions.

Figure 11:
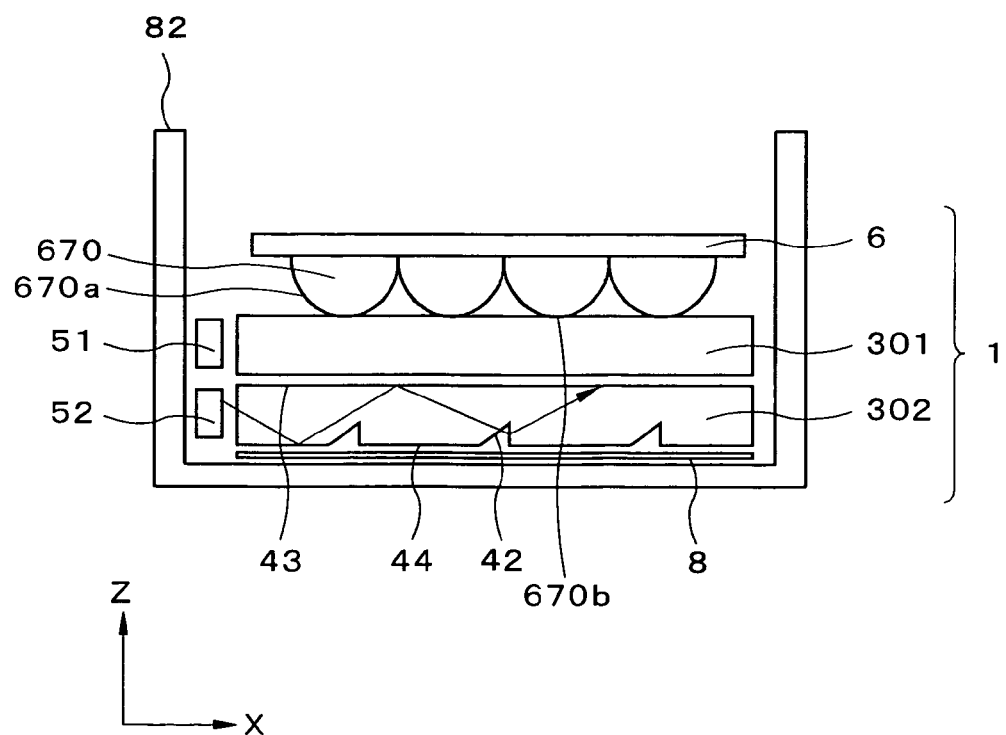
FIG. 11 is an optical model diagram showing the behavior of light when the wide-angle light source is turned on, and is a sectional view showing a case in particular in which light propagated at a critical angle reaches a tilted surface.
Figure 12:
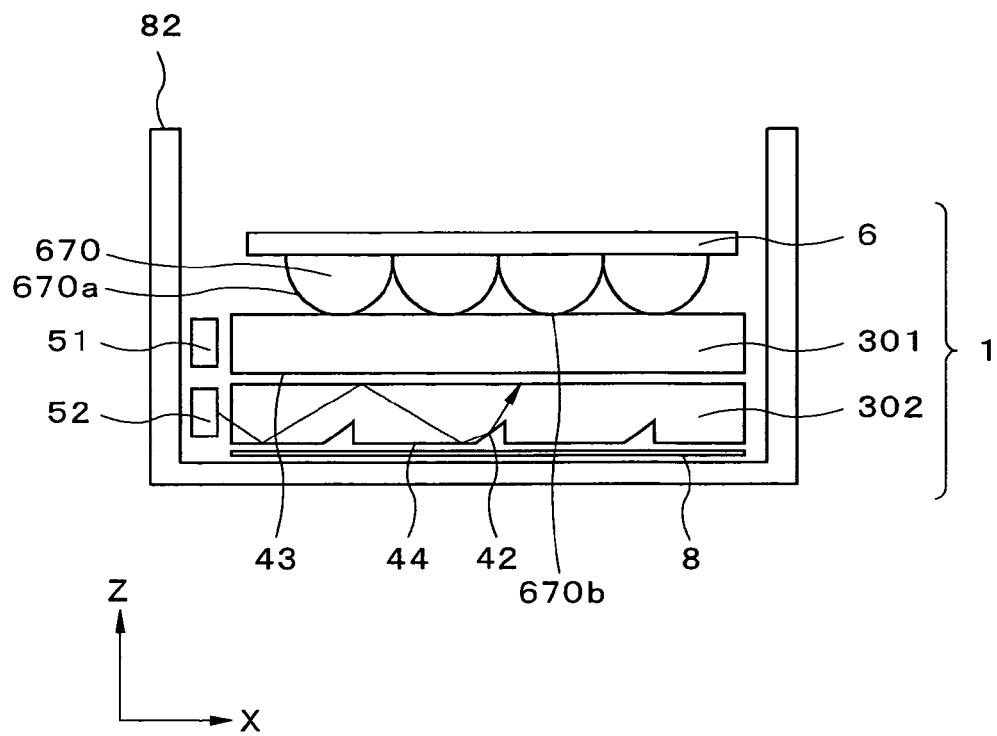
FIG. 12 is an optical model diagram showing the behavior of light that is propagated through the light-guide plate.

FIGS. 11 and 12 are sectional views showing light propagated through the light-guide plate 302, and show cases in which light that is propagated at the critical angle reaches the tilted surfaces 42. Since the critical angle of the light-guide plate 302 is 41.8 degrees as previously mentioned, light that is propagated at the critical angle enters the tilted surfaces 42 at an angle that is tilted 3.2 degrees from the direction of a line normal to the tilted surfaces 42. This angle is smaller than the critical angle, and the light is therefore emitted to the outside of the light-guide plate 302. However, most of the light is reintroduced into the light-guide plate 302 from an adjacent perpendicular surface, i.e., from the boundaries between the tilted surfaces 42 and the surface on the −Z side (see FIG. 11). The angle of incidence on this perpendicular surface is tilted 40.2 degrees from the direction of the normal line, and the angle after incidence on the perpendicular surface is 25.5 degrees. Accordingly, since the incidence angle when this light reaches the surface on the −Z side is 64.5 degrees, the light undergoes total reflection and is propagated in the light-guide plate 302. Most of the light whose incidence angle upon reaching the tilted surfaces 42 is smaller than the critical angle reenters the light-guide plate 302 after being once emitted to the outside of the light-guide plate 301, and is propagated through the light-guide plate 302 at a larger angle. A portion of the light cannot reenter the light-guide plate 302 from the boundaries between the tilted surfaces 42 and the surface on the −Z side after being emitted from the tilted surfaces 42, but this light is reflected by the reflecting panel 8, and reenters the light-guide plate 302.

As shown in FIG. 12, when light whose angle is 55.6 degrees from the Z-axis direction reaches the tilted surfaces 42 after being totally reflected by the surface of the light-guide plate 302 on the −Z side according to this process, the light is incident on the surface on the −Z side at an angle of 34.4 degrees from the normal line direction, and is emitted from the light-guide plate 302 at an angle of 57.8 degrees from the Z-axis direction. The light emitted from the light-guide plate 302 passes through the light-guide plate 301 and enters the emitted light control sheet 6. This light is then refracted in the reflecting surfaces 670a of the protrusions 670 and scattered in various directions. The emission characteristics of the light source device when the wide-angle light source is on are thereby made such that light is emitted in a wide angle range.

The effects of the present embodiment will next be described. In the present embodiment as described above, a light source device that is capable of switching the angle range of illuminating light can be obtained by alternately switching ON a narrow-angle light source mounted to a narrow-angle light-guide plate, and a wide-angle light source mounted to a wide-angle light-guide plate. The light emitted from the emitted light control sheet 6 of the light source device 1 passes through the transmissive liquid crystal panel 7, whereby an image is associated with the light. An image can thereby be displayed in the display device 2 of the mobile telephone 9. Turning ON the narrow-angle light source 51 in this case narrows the angle range in which the image is visible, so that only the user of the mobile telephone 9 can see the image, and surreptitious viewing by surrounding persons can be prevented. On the other hand, turning ON the wide-angle light source 52 widens the angle range in which the image is visible, so that the image can be seen by multiple observers at the same time.

Figure 13:
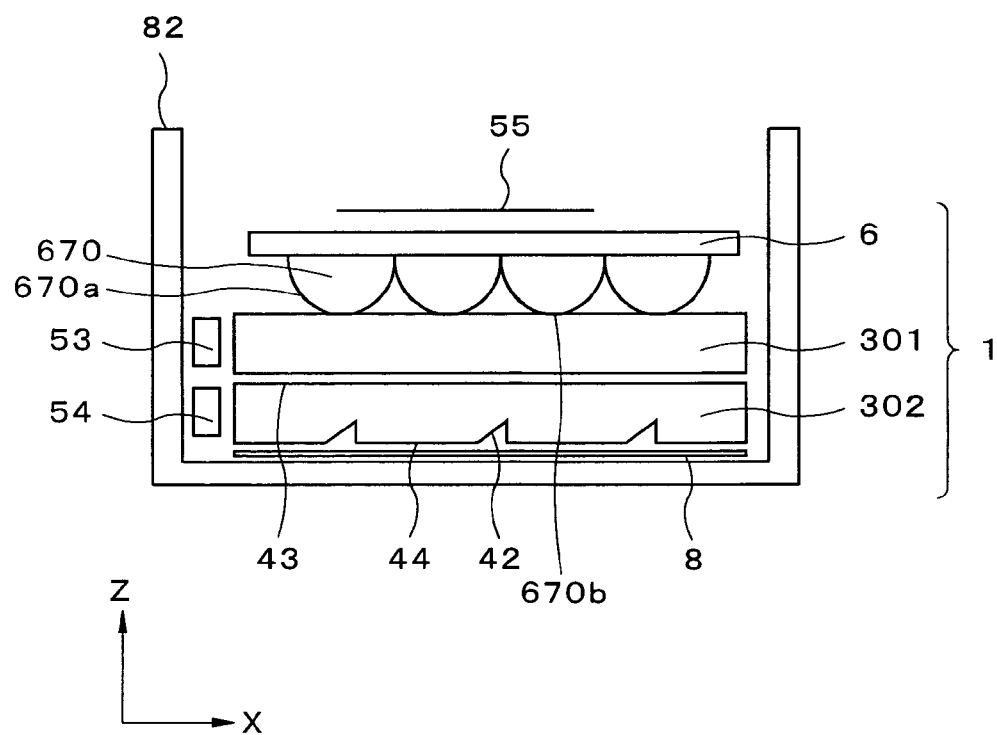
FIG. 13 is an optical model diagram for computer simulation in the first embodiment of the present invention.

A computer simulation was performed using a commercially available ray tracing simulator in order to investigate the validity of the design described above. FIG. 13 is a diagram showing the optical model used in this simulation. As shown in FIG. 13, the length in the X-axis direction, the width in the Y-axis direction, and the height in the Z-axis direction of the light-guide plates 301, 302 were designed to be 60 mm, 40 mm, and 0.6 mm, respectively, and the light-emitting surface 53 as the narrow-angle light source was placed in the YZ plane on the side of the −X direction of the light-guide plate 301 so that the light-emitting surface was facing towards the +X side. The light-emitting surface 54 as the wide-angle light source was placed in the YZ plane on the side of the −X direction of the light-guide plate 302 so that the light-emitting surface was facing towards the +X side. The width in the Y-axis direction of the light-emitting surfaces 53 and 54 was 40 mm, and the height in the Z-axis direction was 0.5 mm. A light-emitting surface that emitted Lambert light was used.

The tilted surfaces 42 were formed in the XY plane on the side of the −Z direction of the light-guide plate 302. The tilted surfaces 42 were tilted at an angle of 45 degrees from the +X direction to the +Z direction, and the tilted surfaces were arranged so as to be continuous in the Y-axis direction. The maximum value of the depth of the Z-axis direction was set to 10 μm, and the pitch in the X-axis direction was set to 0.2 mm.

An emitted light control sheet 6 that had a plurality of spheroids as protrusions with apex points facing in the −Z direction was provided on the side of the +Z direction as viewed from the light-guide plate 301. The spheroids were arranged so that the apex points of the spheroids formed equilateral triangles when viewed from the −Z direction, and so that one side thereof was parallel to the Y-axis direction. The pitch in the Y-axis direction of the cone apex points was 40 μm, and the length of the sides of the equilateral triangles formed by the apex points of the spheroids was 40 μm. The protrusions were such that 37 μm of the distal ends of spheroids having a width of 30 μm in the X-axis direction, a width of 30 μm in the Y-axis direction, and a height of 200 μm in the Z-axis direction protruded from the emitted light control sheet 6, and apexes having a height of 2 μm in the Z-axis direction were adjacent to the light-guide plate 301. The thickness of the emitted light control sheet 6, including the protrusions, was 0.1 mm, and a light-receiving surface 55 having a length of 10 mm in the X-axis direction and a width of 10 mm in the Y-axis direction was installed on the side of the +Z direction of the emitted light control sheet 6. Polymethyl methacrylate having a refractive index of 1.5 was used as the material for the light-guide plates 301, 302 and the emitted light control sheet 6.

Figure 14:
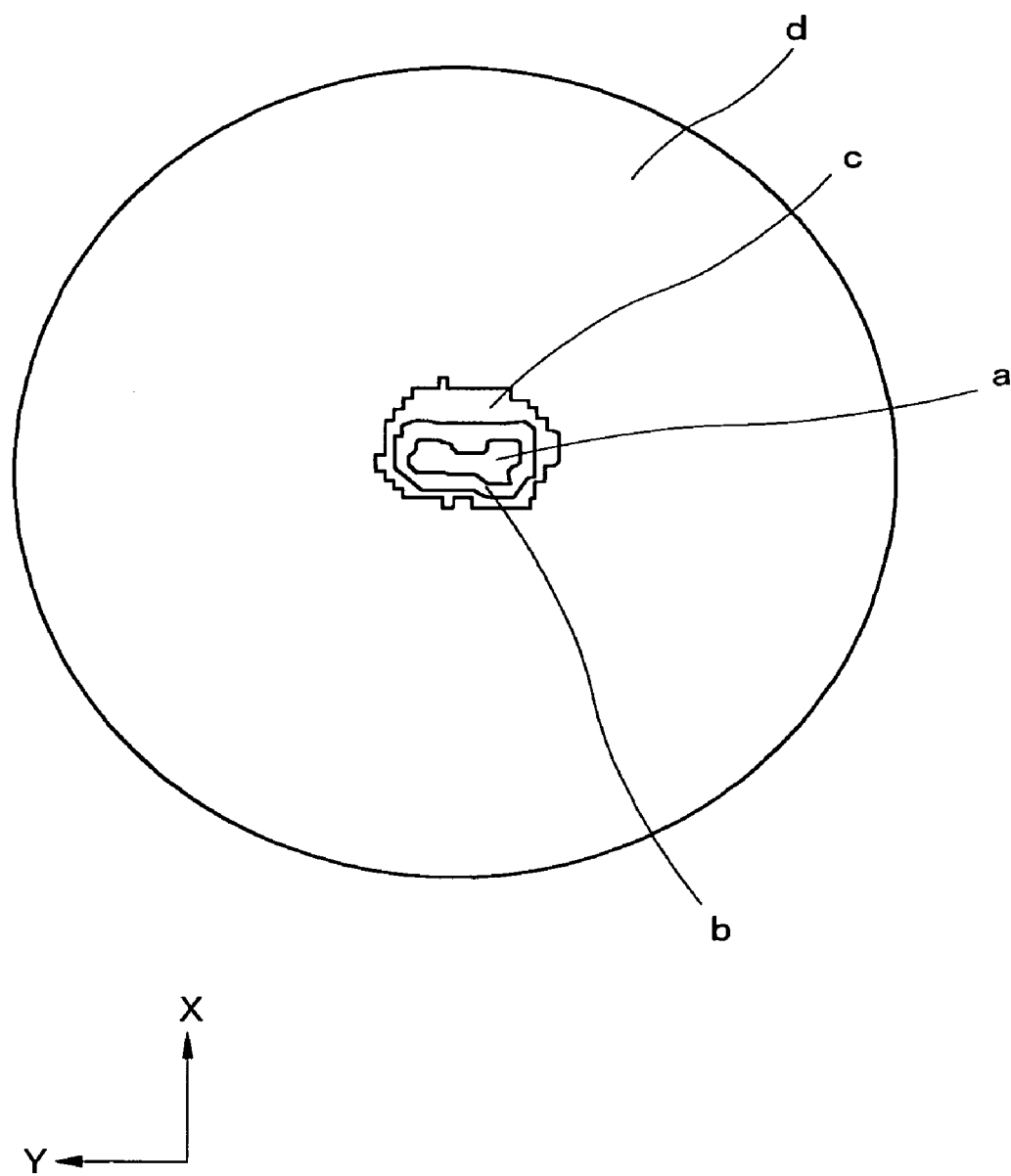
FIG. 14 is a diagram showing the simulation results when the narrow-angle light source is on in the first embodiment of the present invention, and shows the luminance distribution particularly during emission from the emitted light control sheet.
Figure 15:
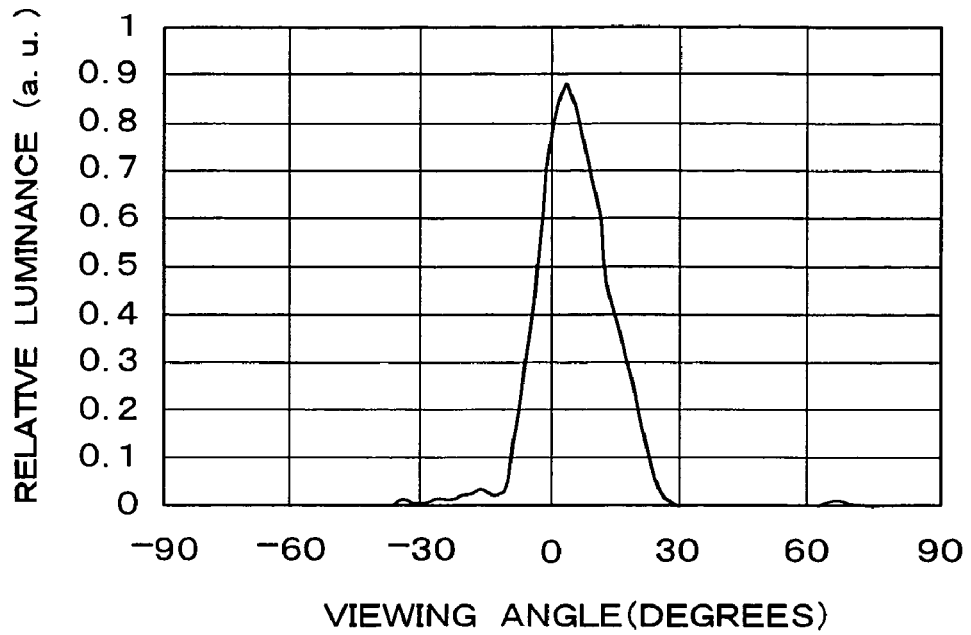
FIG. 15 is a diagram showing the simulation results when the narrow-angle light source is on in the first embodiment of the present invention, and is a graph showing the relative luminance distribution in the X-axis direction in the luminance distribution particularly during emission from the emitted light control sheet.
Figure 16:
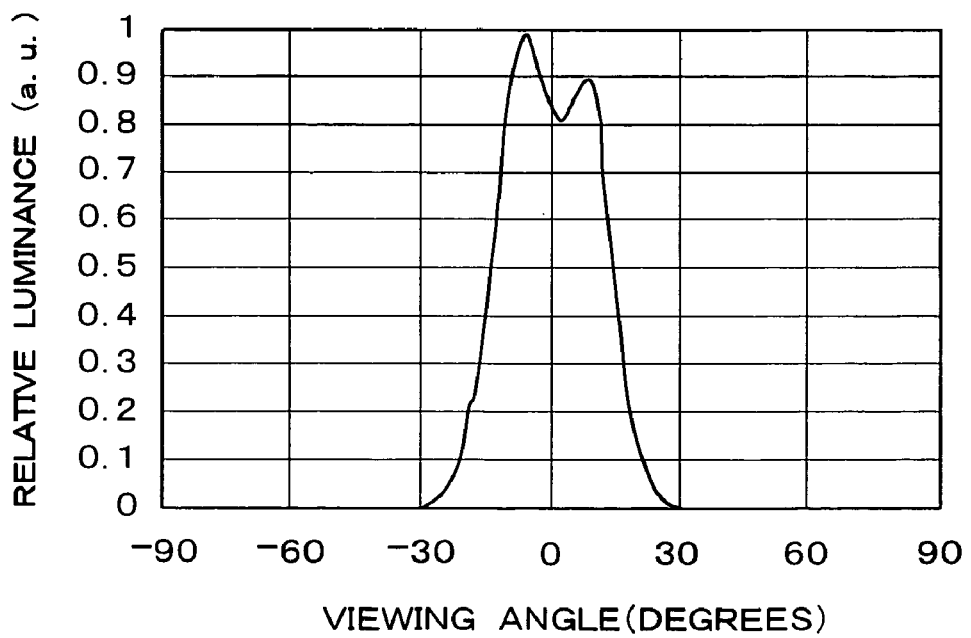
FIG. 16 is a diagram showing the simulation results when the narrow-angle light source is on in the first embodiment of the present invention, and is a graph showing the relative luminance distribution in the Y-axis direction in the luminance distribution particularly during emission from the emitted light control sheet.

The light intensity distribution when the narrow-angle light source was on will next be described. FIG. 14 is a polar-coordinate diagram showing the luminance distribution during emission from the emitted light control sheet when the narrow-angle light source was on, and the X direction and Y direction are shown in the drawing. FIG. 15 is a graph showing the luminance distribution of the X-axis direction in the luminance distribution shown in FIG. 14, wherein the viewing angle in the X-axis direction is plotted on the horizontal axis, and the relative luminance is plotted on the vertical axis. FIG. 16 is a graph showing the luminance distribution of the Y-axis direction in the luminance distribution shown in FIG. 14, wherein the viewing angle in the Y-axis direction is plotted on the horizontal axis, and the relative luminance is plotted on the vertical axis. In FIG. 14, points having equal brightness are connected by solid lines, and the areas enclosed by the solid lines are designated as areas a, b, c, and d in order of brightness. Specifically, the brightest area was designated as area a, and the darkest area was designated as area d. The same applies in the other polar coordinate diagrams described hereinafter.

As shown in FIGS. 14 through 16, the luminance distribution during emission from the emitted light control sheet is focused at 30 degrees or less in both the X-axis direction and the Y-axis direction. Specifically, it is apparent that the radiation range of the light source device is limited to a narrow range of angles when the narrow-angle light source is on.

Figure 17:
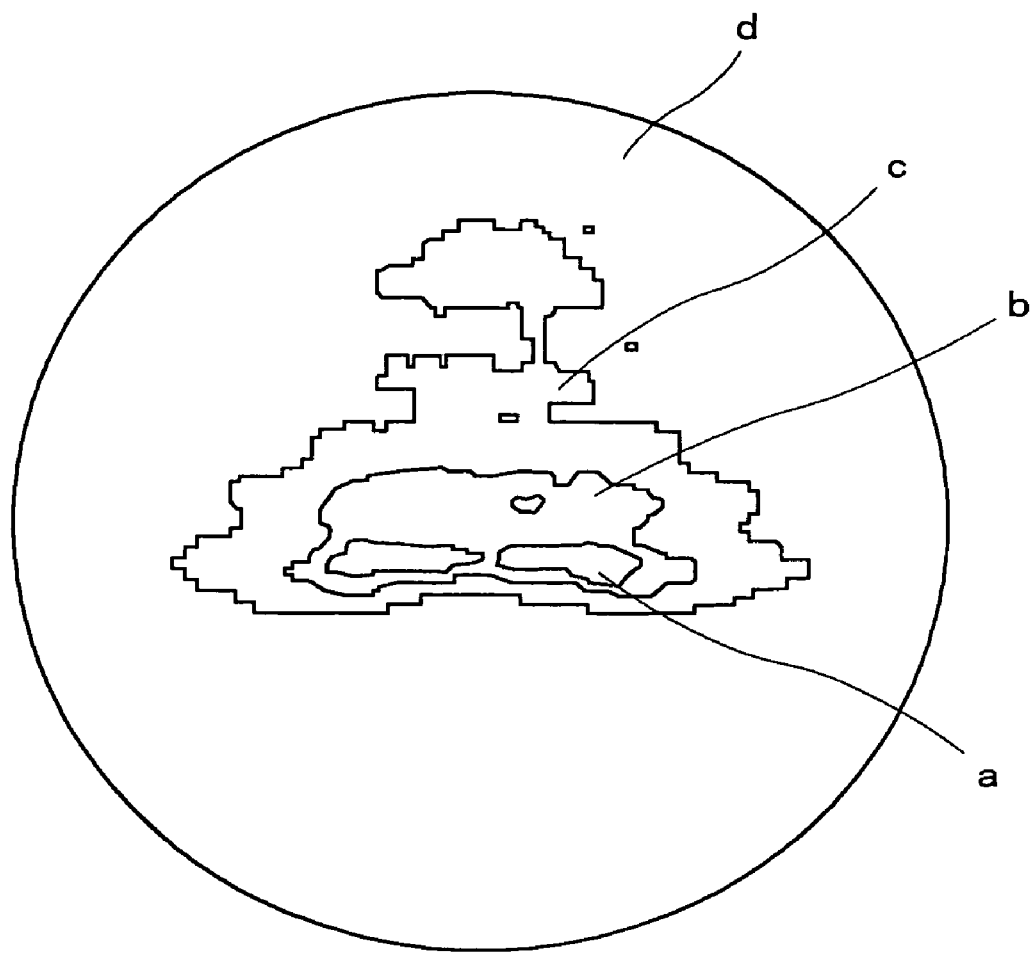
FIG. 17 is a diagram showing the simulation results when the wide-angle light source is on in the first embodiment of the present invention, and shows the luminance distribution particularly during emission from the emitted light control sheet.
Figure 18:
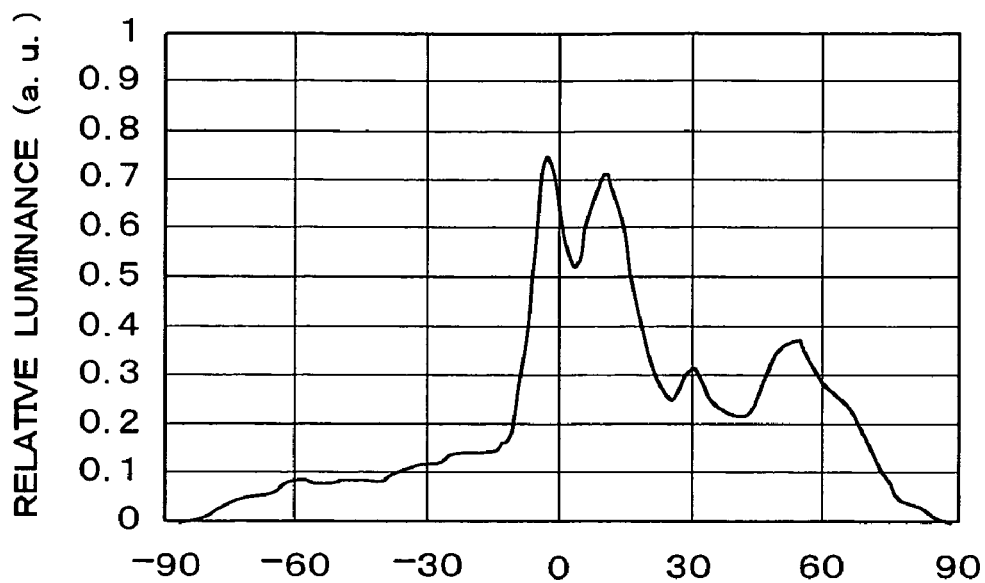
FIG. 18 is a diagram showing the simulation results when the wide-angle light source is on in the first embodiment of the present invention, and is a graph showing the relative luminance distribution in the X-axis direction in the luminance distribution particularly during emission from the emitted light control sheet.
Figure 19:
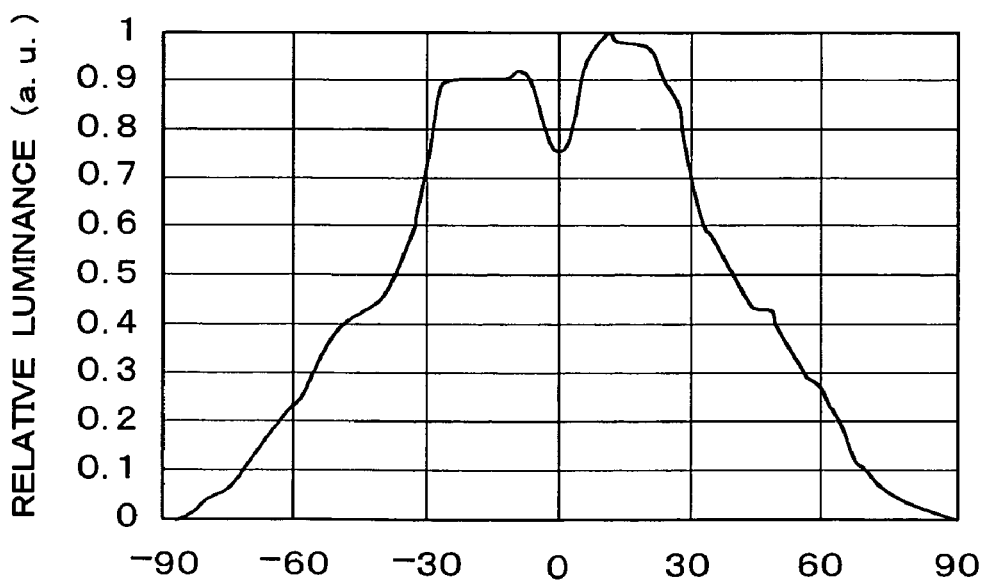
FIG. 19 is a diagram showing the simulation results when the wide-angle light source is on in the first embodiment of the present invention, and is a graph showing the relative luminance distribution in the Y-axis direction in the luminance distribution particularly during emission from the emitted light control sheet.

The luminance distribution when the wide-angle light source is on will next be described. FIG. 17 is a polar-coordinate diagram showing the luminance distribution during emission from the emitted light control sheet when the wide-angle light source was on, and the X direction and Y direction are shown in the drawing. FIG. 18 is a graph showing the luminance distribution of the X-axis direction in the luminance distribution shown in FIG. 17, wherein the viewing angle in the X-axis direction is plotted on the horizontal axis, and the relative luminance is plotted on the vertical axis. FIG. 19 is a graph showing the luminance distribution of the Y-axis direction in the luminance distribution shown in FIG. 17, wherein the viewing angle in the Y-axis direction is plotted on the horizontal axis, and the relative luminance is plotted on the vertical axis.

As shown in FIGS. 17 through 19, the luminance distribution during emission from the emitted light control sheet has a wide range in both the X-axis direction and the Y-axis direction. Specifically, it is apparent that the radiation range of the light source device has a wide-angle distribution when the wide-angle light source is on.

It was confirmed by computer simulation as described above that a light source device that is capable of switching the angle range of illuminating light can be obtained by alternately switching ON a narrow-angle light source mounted to a narrow-angle light-guide plate, and a wide-angle light source mounted to a wide-angle light-guide plate.

According to the light source device of the present invention, the angle range of illuminating light can be switched merely by the switching ON of light sources. Since the narrow-angle light-guide plate and the emitted light control sheet are disposed on the top surface of the light source device, i.e., on the +Z side, the light emitted from the emitted light control sheet when the narrow-angle light source is on is not scattered by other structures of the light source device. Excellent directivity can thereby be realized, particularly when the angle range of illuminating light is narrow. In the structure of the present invention in particular, a tilted surface is not provided to the narrow-angle light-guide plate, and light is output from the apexes of the protrusions on the emitted light control sheet that are adjacent to the narrow-angle light-guide plate. Therefore, in contrast with a wide-angle light-guide plate that has a tilted surface, there is no light emitted towards the back surface of the light-guide plate. Even if light is emitted towards the −Z side, this light is transmitted through the wide-angle light-guide plate and is regularly reflected by a reflecting panel, and is again passed through the wide-angle light-guide plate to enter the narrow-angle light-guide plate. However, since the light that is incident on the narrow-angle light-guide plate from the surface on the −Z side of the narrow-angle light guide plate passes through the narrow-angle light-guide plate without being totally reflected by the surface on the +Z side of the narrow-angle light-guide plate, the light is scattered by the emitted light control sheet, and the emitted light has reduced directivity as a result. Specifically, since there is essentially no light emitted towards the back side of the narrow-angle light-guide plate in the present invention, the directivity can be increased when the narrow-angle light source is on.

As previously mentioned, when the narrow-angle light source is on, the illumination range of the light source device is limited to a narrow angle range, and a narrow-angle display is therefore obtained in which the viewing angle of the display device is limited to a narrow angle range. When the wide-angle light source is on, the illumination of the light source device is distributed in a wide angle range, and a wide-angle display is therefore obtained in which the viewing angle of the display device is set to a wide angle range. As described above, the display device of the present invention enables the viewing angle to be switched merely by the switching ON of light sources. As also previously mentioned, the directivity of emitted light is high when the narrow-angle light source is on, and the present invention is therefore highly effective for preventing surreptitious viewing.

The aforementioned numerical values defining the shape of the protrusions on the emitted light control sheet are not limiting, and different numerical values may be used insofar as the same effects are demonstrated. The material used for the emitted light control sheet is also not limited by the aforementioned material. The apex points of the protrusions were also positioned so as to form an equilateral triangle, but this configuration is not limiting, and the apex points may form a shape other than an equilateral triangle. The side of the triangle is also not necessarily completely parallel to the Y-axis, and may be positioned at an angle with respect to the Y-axis in order to prevent moiré with the display panel. However, the phase of the positions of the apexes in the X-axis direction is preferably not uniform in relation to the Y-axis direction. Since it is thereby possible to increase the ratio of the apexes per unit of surface area, light can be more efficiently output from the light-guide plate when the narrow-angle light source is on than when the phase in the X-axis direction is uniform in relation to the Y-axis direction. Furthermore, a diffusion pattern may be provided to the surface on the opposite side from the surface on which the protrusions are formed in the emitted light control sheet. Moiré can thereby be prevented from occurring with the display panel. The shape of the protrusions may also be longer in the X-axis direction than in the Y-axis direction. This configuration makes it possible to reduce the light condensation properties in the X-axis direction when the narrow-angle light source is on, and to allow viewing angle switching effects to be present only in the horizontal direction of the image.

The aforementioned numerical values defining the tilt angle of the tilted surfaces provided to the wide-angle light-guide plate are not limiting, and different numerical values may be used insofar as the same effects are demonstrated. The tilted surfaces may also be composed of curved surfaces. A larger number of scattering directions can thereby be realized, and the uniformity of the illumination range can be enhanced. The material used for the light-guide plates is also not limited by the aforementioned material. The depth and pitch of the tilted surfaces are also not limited by the aforementioned numerical values, and different values may be used within the light-guide plates, or the tilt angles of the tilted surfaces may be distributed within the light-guide plates. The in-plane distribution of light emitted by the light source device can be made uniform particularly by increasing the pitch of tilted surfaces that are near the light sources in the light-guide plates. A light-guide plate that has a dot pattern printed on the surface thereof can also be suitable for use as a wide-angle light-guide plate.

A cold cathode tube or other linear light source may also be used for the light source, and an LED (Light Emitting Diode) or other point light source may also be used. The thickness of the light source can be reduced, particularly when an LED is used. A plurality of LEDs may be provided to the light-incident surface of a light-guide plate, but particularly when the narrow-angle light source is on, since the light from the light source is condensed and emitted in a narrow angle range, the intensity of the light source can be further reduced in relation to the wide-angle light source. Specifically, the number of LED in the narrow-angle light source can be made less than the number of LED in the wide-angle light source, and cost can be reduced. It is possible to use less power during narrow-angle display than during wide-angle display, thereby enabling lower power consumption. The narrow-angle light source was turned off when the wide-angle light source was on in the description given above, but the narrow-angle light source is not necessarily turned off, and may also be on. An intensity adjustment unit may also be provided that is capable of adjusting the intensities of the wide-angle light source and the narrow-angle light source independently from each other, and the emission ratios of both light sources may also be varied. Furthermore, the narrow-angle light source was described as being disposed on the surface on the −X side of the narrow-angle light-guide plate in the present embodiment, but this configuration is not limiting. Particularly when the narrow-angle light source is disposed at a corner of the narrow-angle light-guide plate, uniformity in the emission plane of the light source device can be enhanced using even a small amount of light in comparison to a case in which the narrow-angle light source is provided to a side surface of the light-guide plate.

By placing the narrow-angle light source and the wide-angle light source in the same position with respect to the corresponding light-guide plates (a position on the surface on the −X side with respect to each light-guide plate in the present embodiment), the bottom surface area of the light source device can be reduced in comparison to a case in which the light sources are each disposed in different positions from the corresponding light-guide plates, as described in a second embodiment of the present invention.

The display panel used in combination with the light source device of the present invention is not limited to a transmissive liquid crystal panel, and any display panel that uses a light source device may be used. However, a liquid crystal panel is suitable that has minimal dependence on viewing angle. Examples of the mode of such a liquid crystal panel include IPS (In-Plane Switching), FFS (Fringe Field Switching), AFFS (Advanced Fringe Field Switching), and the like among horizontal field modes. Vertical alignment modes include MVA (Multi-domain Vertical Alignment), which is multi-domain and possesses reduced viewing-angle dependency; PVA (Patterned Vertical Alignment); ASV (Advanced Super V); and the like. Furthermore, a liquid crystal display panel that operates on the film-compensated TN principle may also be appropriately used. The liquid crystal panel is also not limited to the transmissive type, and any panel that has a transmissive area in each pixel may be used. It is also possible to use a transflective liquid crystal panel having a reflective area in a portion of each pixel, a micro-transmissive liquid crystal panel, or a micro-reflective liquid crystal panel.

The light source device of the present embodiment may be suitably applied in a mobile telephone or other mobile terminal device to enable a viewing-angle-switchable display in a display device that is installed in the mobile terminal device. Particularly when the light source device of the present embodiment is installed in a mobile telephone, the light source can be placed on the lower side of the display screen by setting the transverse direction and longitudinal direction of the mobile telephone so as to be the Y-axis direction and X-axis direction, respectively, of the light source device.

The transverse width of a mobile telephone is generally limited to a size that allows easy carrying in the hand, but since the transverse width of the display region is preferably increased for displaying text information, the size of the non-display region tends to be reduced in the transverse width of the mobile telephone. The light source device of the present embodiment is more suitable for use because there is no need to install a light source on the left and right of the display screen. Compatible mobile terminal devices include not only mobile telephones, but also PDAs, gaming devices, digital cameras, digital video cameras, notebook-type personal computers, and various other types of mobile terminal devices. The display device may be installed not only in mobile terminal devices, but also in cash dispensers, vending machines, and other various types of fixed terminal devices.

The mobile terminal device equipped with the light source device of the present embodiment may also be provided with an intensity adjustment unit that is capable of adjusting the intensities of the wide-angle light source and the narrow-angle light source independently from each other, and this intensity adjustment unit may also be capable of setting the emission ratios of both light sources. A user can thereby set the optimum viewing angle according to the operating environment. The mobile terminal device may also comprise a residual battery power detection unit for detecting residual battery power, and may comprise a control unit that is capable of adjusting the intensities of the light sources 51 and 52 or switching the light sources 51 and 52 on or off according to the detected residual battery power, and automatically varying the viewing angle.

Figure 20:
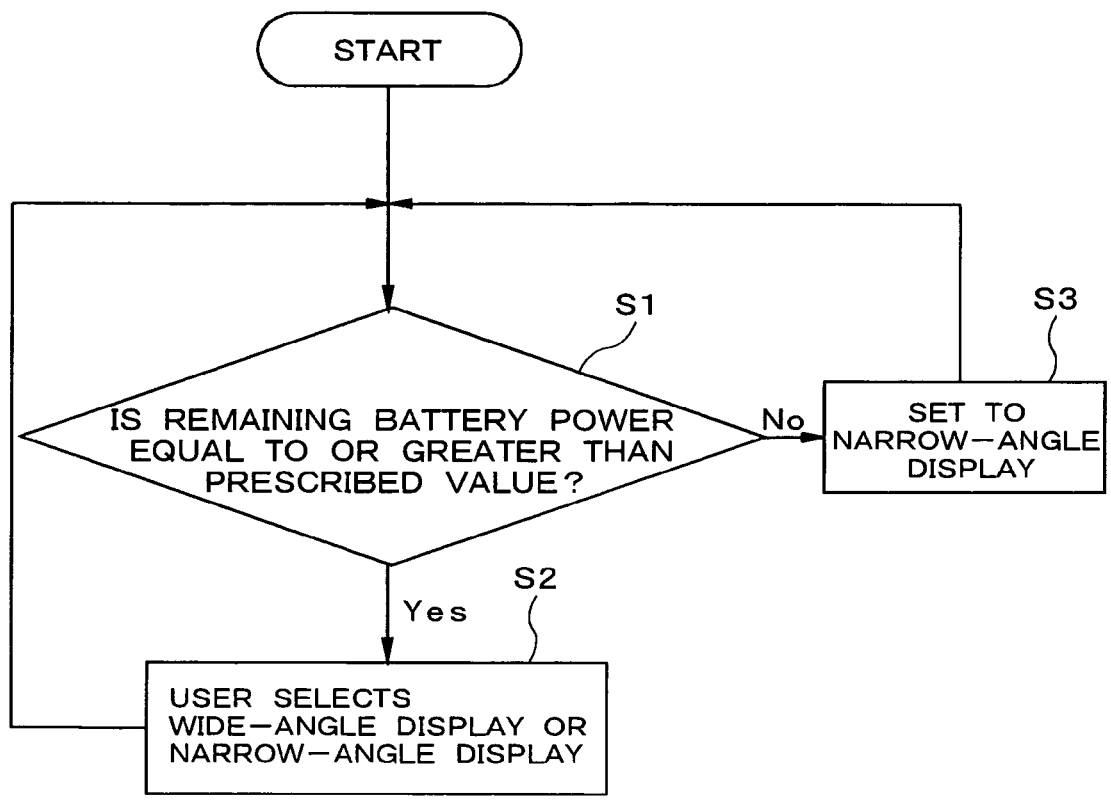
FIG. 20 is a flowchart showing the operation of the mobile terminal device according to a first modified example of the first embodiment.

A first modified example of the present embodiment will next be described. The mobile terminal device according to the present modified example is provided with a residual battery power detection unit (not shown), wherein the residual battery power detection unit detects electrical power remaining in a battery, and automatically switches to the narrow-angle display when the residual power is less than a prescribed value. The operation of this mobile terminal device will be described hereinafter. FIG. 20 is a flowchart showing the operation of the mobile terminal device according to the present modified example.

In an initial state, the power supply to the mobile terminal device is turned off by a user (observer). As shown in step S1 of FIG. 20, when the power supply to the mobile terminal device is turned on, the residual battery power detection unit detects the amount of electrical power remaining in a battery, and detects whether the residual power is equal to or above a prescribed value, or is less than the prescribed value. When the detected result is equal to or above the prescribed value, a viewing angle control unit enables the user to select wide-angle display or narrow-angle display, as shown in step S2. The user can thereby select wide-angle display or narrow-angle display for use according to the environment and the user's wishes. The process then returns to step S1. When the result of detection by the residual battery power detection unit is less than the prescribed value, the viewing angle control unit sets the display to narrow-angle display, and only the light source 51 is turned on, as shown in step S3. The process then returns to step S1.

As described above, since less power can be used during narrow-angle display than during wide-angle display in the light source of the present embodiment, power consumption can be reduced in the mobile terminal device of the present modification by automatically changing to narrow-angle display when there is little remaining battery power, and the mobile terminal device can be operated for a longer time.

Figure 21:
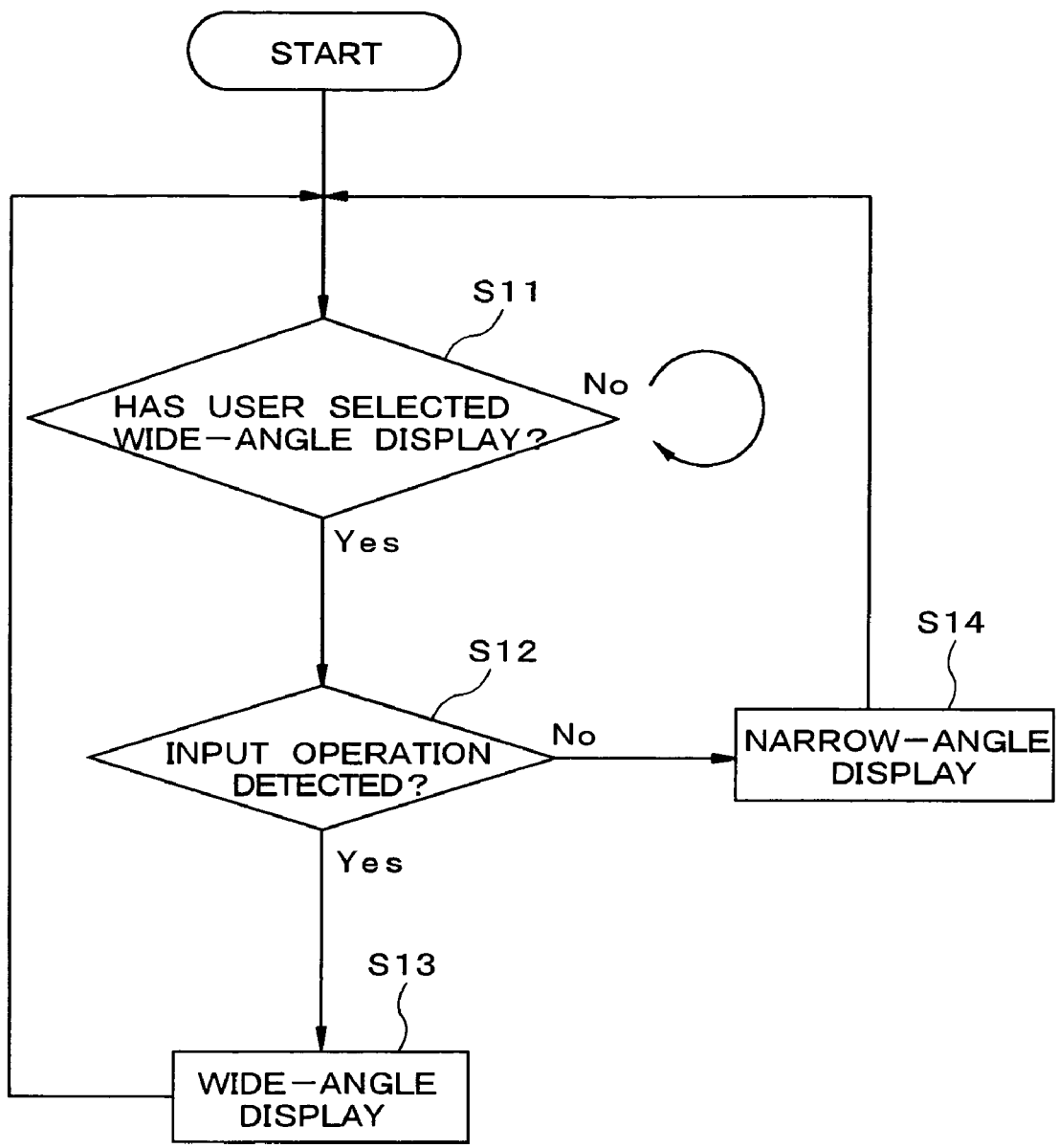
FIG. 21 is a flowchart showing the operation of the mobile terminal device according to a second modified example of the first embodiment.

A second modified example of the present embodiment will next be described. The mobile terminal device according to the present modified example is provided with an input detection unit (not shown) for detecting an input operation, a timer (not shown) for measuring a specific time, and a viewing angle control unit (not shown) for controlling the viewing angle based on results of detection by the input detection unit. During wide-angle display, when an input operation is not detected in the specific time measured by the timer, the display is automatically switched to narrow-angle display. The operation of this mobile terminal device will be described hereinafter. FIG. 21 is a flowchart showing the operation of the mobile terminal device according to the present modified example.

In an initial state, the power supply to the mobile terminal device is turned off by a user (observer). As shown in step S11 of FIG. 21, when the power supply to the mobile terminal device is turned on, the mobile terminal device detects whether the user has selected wide-angle display or narrow-angle display. When the detection results indicate the selection of narrow-angle display, the process returns to step S11, and narrow-angle display is continued. When the detection results indicate the selection of wide-angle display, the process proceeds to step S12, and the mobile terminal device starts the timer. During the specific time measured by the timer, the input detection unit detects whether an input operation is performed in the mobile terminal device. When an input operation is detected during the specific time, the viewing angle control unit implements the wide-angle display state selected by the user, as shown in step S13. Specifically, wide-angle display is continued. The process then returns to step S11. In step S12, when an input operation is not detected during the specific time, the viewing angle control unit switches the display of the mobile terminal device to narrow-angle display, and causes only the light source 51 to turn on, as shown in step S14. The process then returns to step S11.

Power consumption can therefore be reduced by automatically switching to narrow-angle display when the mobile terminal device of the present modified example is in an input standby state, and the operating time of the mobile terminal device can be extended. When an input operation is not detected, by repeating a loop composed of steps S11, S12, and S14, the display can be automatically restored to wide-angle display when the input detection unit detects an input operation after the automatic switch to narrow angle display.

Figure 22:
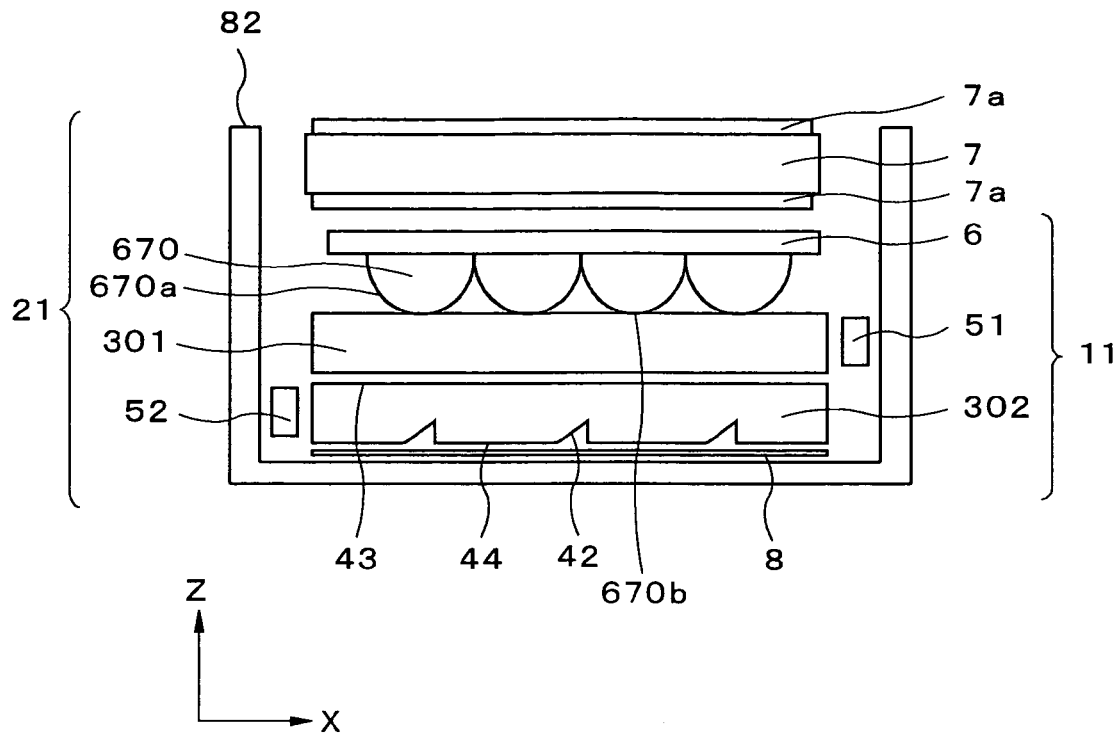
FIG. 22 is a sectional view showing the display device according to a second embodiment of the present invention.

The light source device and the display device that uses the light source device according to a second embodiment of the present invention will next be described. FIG. 22 is a sectional view showing the display device of the present embodiment. As shown in FIG. 22, the light source device 11 of the present embodiment differs from the light source device 1 (see FIG. 4) of the aforementioned first embodiment in that a narrow-angle light source 51 is provided to the surface on the +X side of the narrow-angle light-guide plate 301. Other structural aspects of the present embodiment are the same as in the aforementioned first embodiment.

In the present embodiment, the narrow-angle light source 51 is provided to the surface on the +X side of the narrow-angle light-guide plate 301, and a wide-angle light source 52 is provided to the surface on the −X side of a wide-angle light-guide plate 302. Specifically, the narrow-angle light source and the wide-angle light source are not placed so as to overlap each other in the Z-axis direction. The effect of the thickness of the light sources on the overall thickness of the device can thereby be reduced, and a thin profile can be obtained in comparison to a case in which the light sources are placed overlapping each other, such as in the first embodiment of the present invention. Furthermore, since the narrow-angle light source and the wide-angle light source are not placed in proximity to each other, heat is easily dissipated from the light source unit, and a temperature increase in the light source unit can be suppressed. Other aspects of the structure and operation of the light source device 11 of the present embodiment are the same as in the light source device 1 of the first embodiment.

Figure 23:
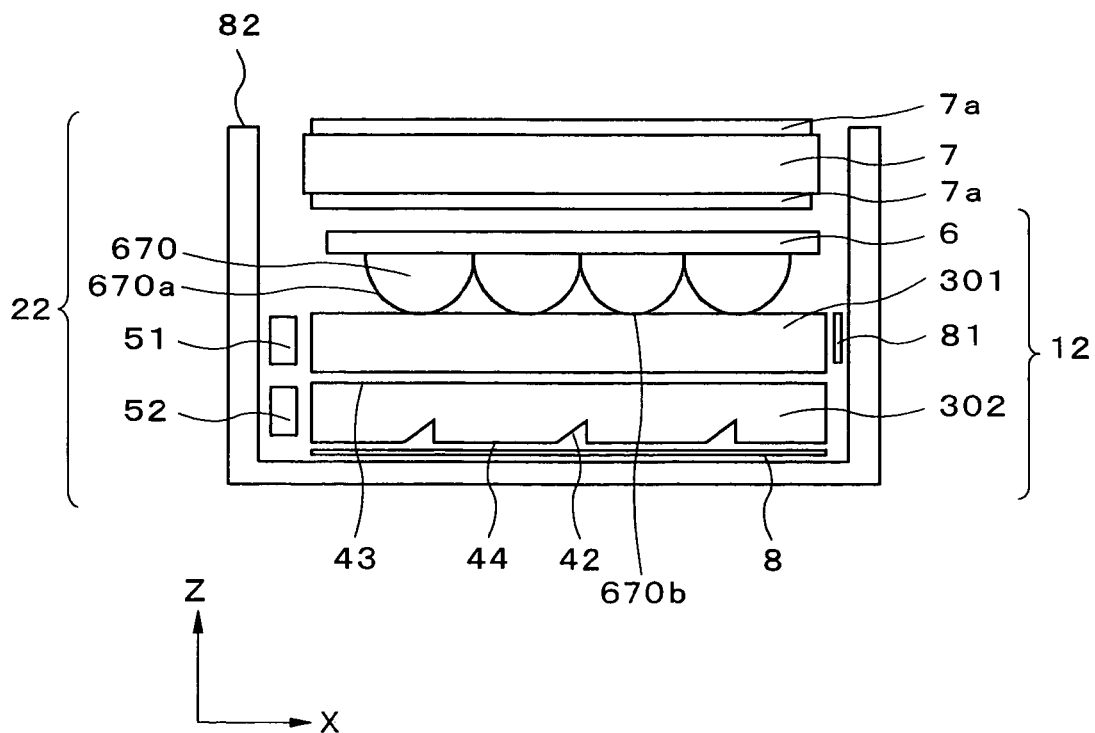
FIG. 23 is a sectional view showing the display device according to a third embodiment of the present invention.

The light source device and the display device that uses the light source device according to a third embodiment of the present invention will next be described. FIG. 23 is a sectional view showing the display device of the present embodiment. As shown in FIG. 23, the light source device 12 of the present embodiment differs from the light source device 1 (see FIG. 4) of the aforementioned first embodiment in that a reflecting panel 81 is mounted to the surface that is most distant from the narrow-angle light source 51, i.e., the surface on the +X side, in the narrow-angle light-guide plate 301. Other structural aspects of the present embodiment are the same as in the aforementioned first embodiment.

The operation of the light source device 12 of the present embodiment thus configured will next be described. In the present embodiment, the operation performed when the wide-angle light source 52 is on is the same as in the aforementioned first embodiment. The operation is also the same when the narrow-angle light source 51 is on, wherein the light emitted from the light source 51 is propagated in the narrow-angle light-guide plate 301, and a portion of the light is emitted in the frontal direction from the emitted light control sheet. Since a reflecting panel 81 is mounted to the surface on the +X side of the narrow-angle light-guide plate 301 in the present embodiment, light that propagates through the narrow-angle light-guide plate 301 without being emitted from the emitted light control sheet and reaches the surface on the +X side of the narrow-angle light-guide plate can be reflected in the −X direction by the reflecting panel 81. The reflected light is propagated through the narrow-angle light-guide plate 301 in the −X direction, and a portion of the light is emitted in the frontal direction from the emitted light control sheet.

Figure 24:
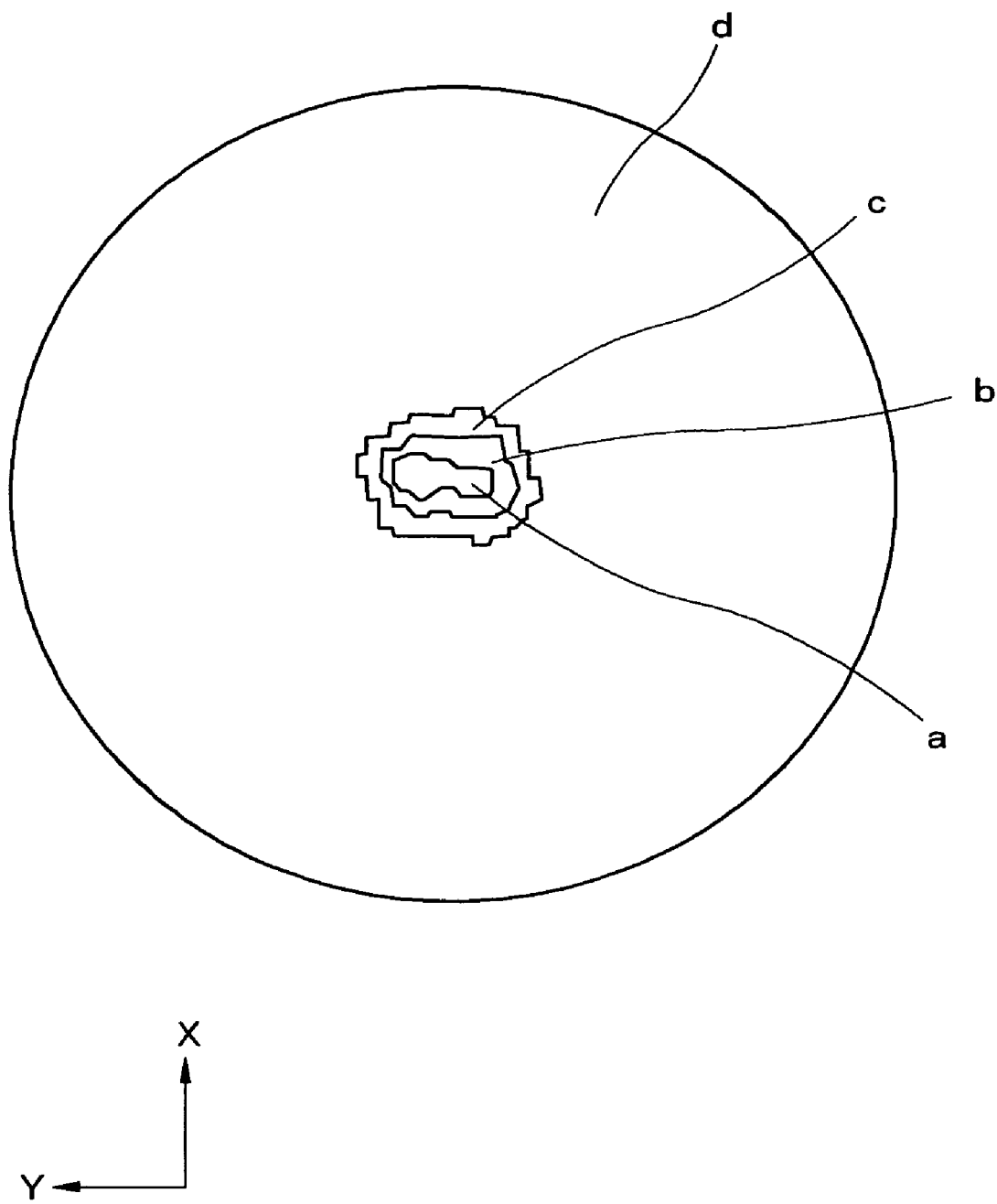
FIG. 24 is a diagram showing the simulation results when the narrow-angle light source is on in the third embodiment of the present invention, and shows the luminance distribution particularly during emission from the emitted light control sheet.
Figure 25:
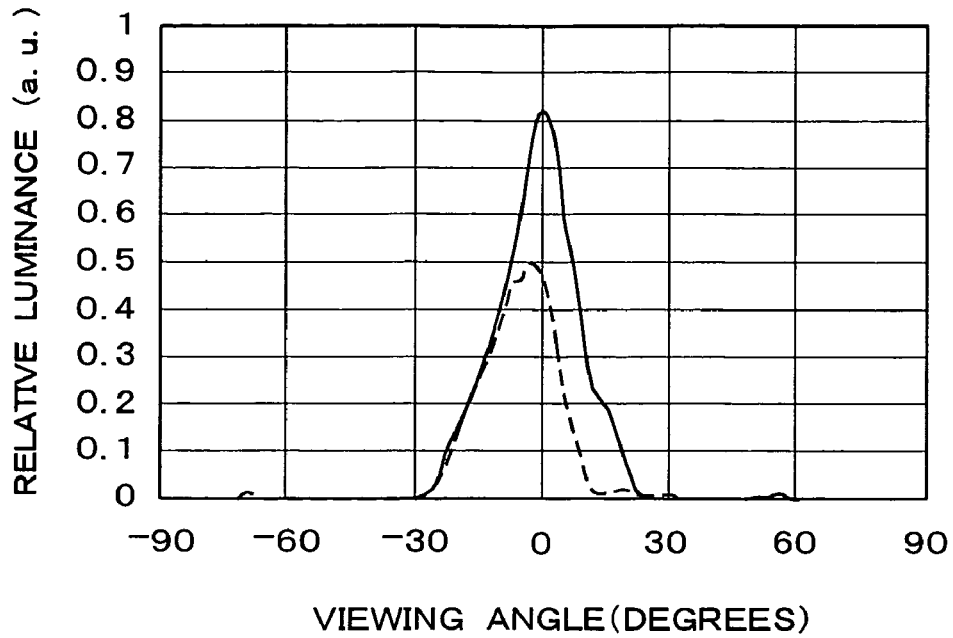
FIG. 25 is a diagram showing the simulation results when the narrow-angle light source is on in the third embodiment of the present invention, and is a graph showing the relative luminance distribution in the X-axis direction in the luminance distribution particularly during emission from the emitted light control sheet.
Figure 26:
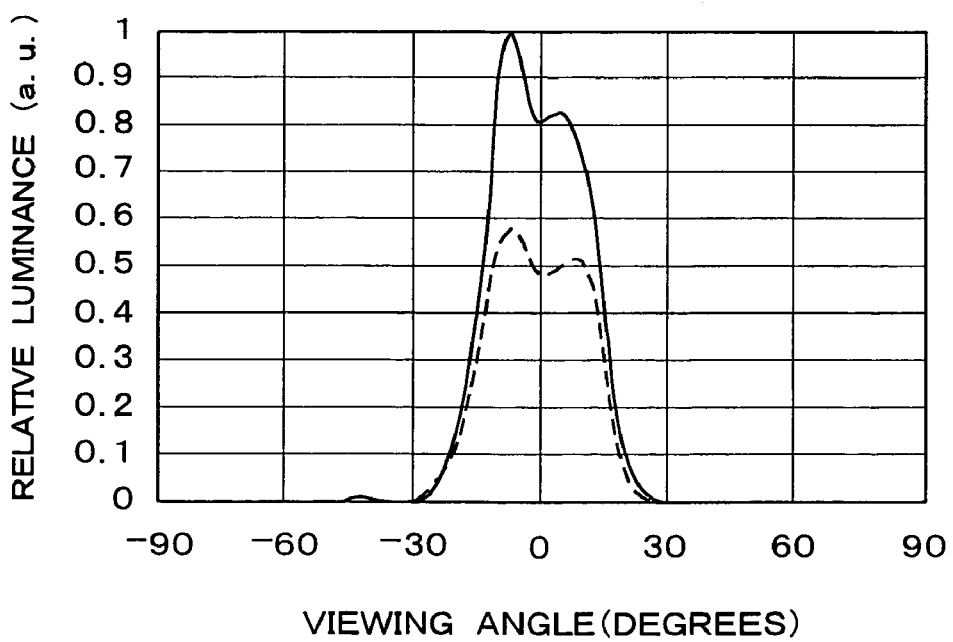
FIG. 26 is a diagram showing the simulation results when the narrow-angle light source is on in the first embodiment of the present invention, and is a graph showing the relative luminance distribution in the Y-axis direction in the luminance distribution particularly during emission from the emitted light control sheet.

A computer simulation was performed in the same manner as in the first embodiment using a commercially available ray tracing simulator in order to investigate the validity of the abovementioned design. The optical model was the same as in the first embodiment, except that the reflecting panel was provided to the surface on the +X side of the narrow-angle light-guide plate. FIG. 24 is a polar coordinate diagram showing the luminance distribution during emission from the emitted light control sheet when the narrow-angle light source is on, wherein the X direction and Y direction are shown. FIG. 25 is a graph showing the luminance distribution of the X-axis direction in the luminance distribution shown in FIG. 24, wherein the horizontal axis represents the viewing angle in the X-axis direction, and the vertical axis represents the relative luminance. FIG. 26 is a graph showing the luminance distribution of the Y-axis direction in the luminance distribution shown in FIG. 24, wherein the horizontal axis represents the viewing angle in the Y-axis direction, and the vertical axis represents the luminance. As shown in FIGS. 24 through 26, the luminance distribution during emission from the emitted light control sheet is focused within 30 degrees in both the X-axis direction and the Y-axis direction. The luminance distribution of the aforementioned first embodiment is indicated by a dashed line for comparison in FIGS. 25 and 26. It is apparent from these results that the frontal luminance obtained in the present embodiment is approximately twice that of the first embodiment.

As described above, by providing a reflecting panel to the surface on the side of the narrow-angle light-guide plate that is opposite the side on which the narrow-angle light source is mounted, increased luminance can be obtained without compromising directivity when the narrow-angle light source is on. When an LED is used as the light source, by providing the reflecting panel to a portion other than where the LED is provided in the surface of the narrow-angle light-guide plate to which the LED is mounted, light that proceeds towards the −X side can be further reflected towards the +X side. More light can therefore be reflected from the emitted light control sheet, and a further increase in luminance can be obtained. Other aspects of the structure and operation of the light source device 12 of the present embodiment are the same as in the light source device 1 of the first embodiment.

Figure 27:
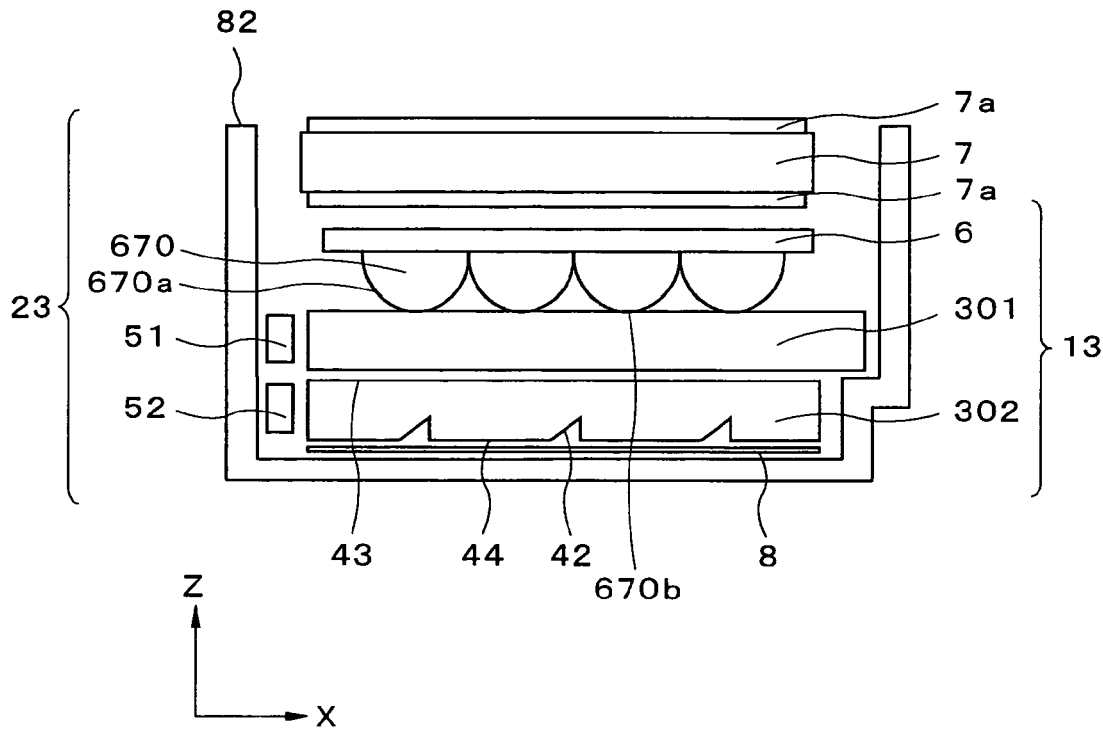
FIG. 27 is a sectional view showing the display device according to a fourth embodiment of the present invention.

The light source device and the display device that uses the light source device according to a fourth embodiment of the present invention will next be described. FIG. 27 is a sectional view showing the display device of the present embodiment. As shown in FIG. 27, the light source device 13 of the present embodiment differs from the light source device 1 (see FIG. 4) of the aforementioned first embodiment in that the narrow-angle light-guide plate 301 is formed so as to be larger than the wide-angle light-guide plate 302. Specifically, the surface on the +X side of the narrow-angle light-guide plate 301 is positioned so that the X coordinates thereof are larger than the X coordinates of the surface on the +X side of the wide-angle light-guide plate 302. Other structural aspects of the present embodiment are the same as in the aforementioned first embodiment.

In the present embodiment, the surface on the +X side of the narrow-angle light-guide plate is positioned towards the outside in relation to the surface on the +X side of the wide-angle light-guide plate. The light emitted from the surface on the +X side of the narrow-angle light-guide plate can therefore be prevented from being scattered by the holder and other components and entering the wide-angle light-guide plate. Excellent directivity can thereby be maintained because the effects of stray light can be reduced when the narrow-angle light source is on.

The surface on the +X side of the narrow-angle light-guide plate was described in the present embodiment as being positioned towards the outside in relation to the surface on the +X side of the wide-angle light-guide plate, but the present invention is not limited by this configuration. The same effects can be demonstrated insofar as the outline in the XY plane of the narrow-angle light-guide plate is larger than the outline of the wide-angle light-guide plate. For example, a surface in the Y-axis direction of the narrow-angle light-guide plate may be disposed further towards the outside than a surface in the Y-axis direction of the wide-angle light-guide plate. A surface of the narrow-angle light-guide plate that faces the light source, i.e., the surface on the −X side, may be disposed further towards the outside than the surface on the −X side of the wide-angle light-guide plate. Other aspects of the structure and operation of the light source device 13 of the present embodiment are the same as in the light source device 1 of the first embodiment.

Figure 28:
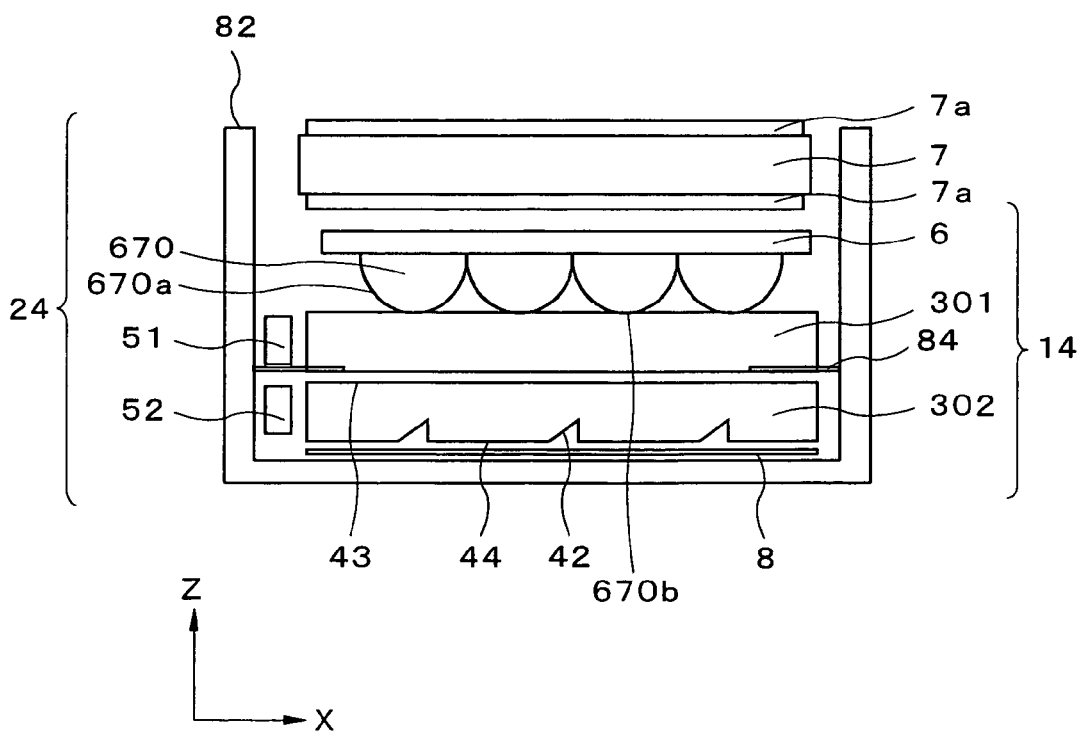
FIG. 28 is a sectional view showing the display device according to a fifth embodiment of the present invention.

The light source device and the display device that uses the light source device according to a fifth embodiment of the present invention will next be described. FIG. 28 is a sectional view showing the display device of the present embodiment. As shown in FIG. 28, the light source device 14 of the present embodiment differs from the light source device 1 (see FIG. 4) of the aforementioned first embodiment in that an opaque sheet 84 is mounted between the narrow-angle light-guide plate 301 and the wide-angle light-guide plate 302. The opaque sheet 84 is positioned at the ends of the light-guide plates 301, 302, i.e., only on the +X-axis side, the −X-axis side, the +Y-axis side, and the −Y-axis side, and is not provided in at least the display area of the display device. The color of the opaque sheet 84 is black, for example. Other structural aspects of the present embodiment are the same as in the aforementioned first embodiment.

In the present embodiment, an opaque sheet 84 is provided to the surface on the −Z side of an end portion of the narrow-angle light-guide plate. The light emitted from the end surface of the narrow-angle light-guide plate can therefore be prevented from being scattered by the holder and other components and entering the wide-angle light-guide plate. Excellent directivity can thereby be maintained because the effects of stray light can be reduced when the narrow-angle light source is on.

The opaque sheet 84 of the present embodiment is not necessarily black, and a white or silver sheet, for example, may also be used insofar as the light emitted from the end portion of the narrow-angle light-guide plate can be prevented from entering the wide-angle light-guide plate. The opaque sheet 84 may also have adhesive properties whereby the narrow-angle light-guide plate and the wide-angle light-guide plate are fixed together. Other aspects of the structure and operation of the light source device 14 of the present embodiment are the same as in the light source device 1 of the first embodiment.

Figure 29:
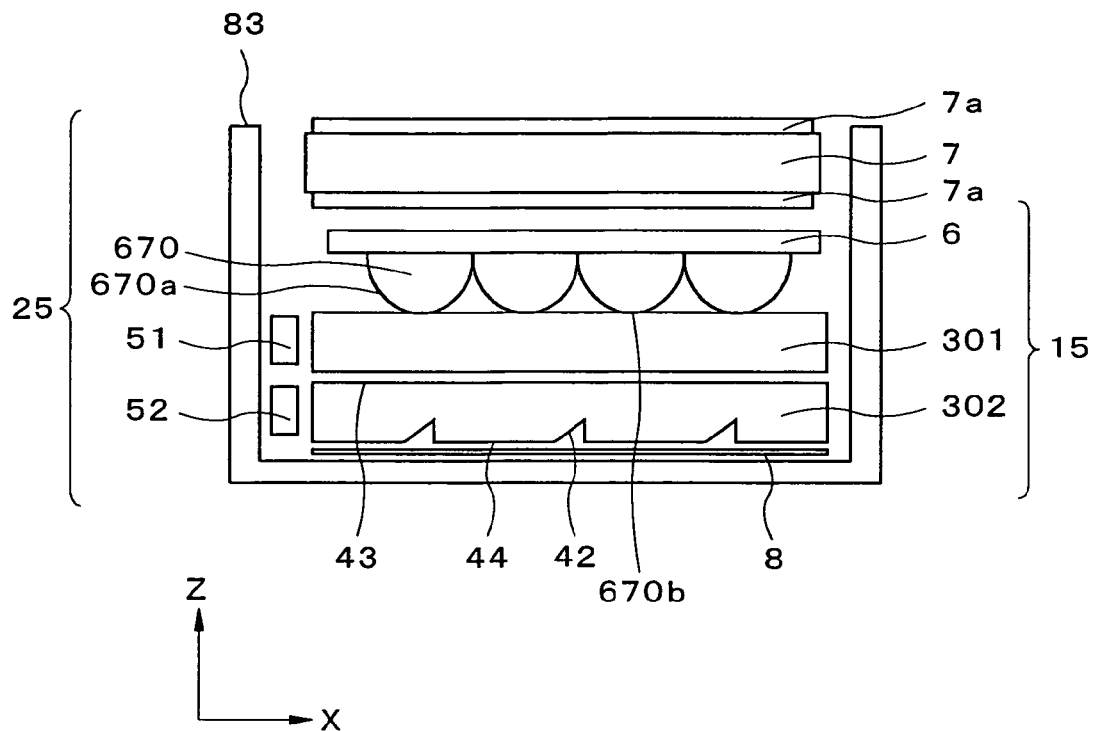
FIG. 29 is a sectional view showing the display device according to a sixth embodiment of the present invention.

The light source device and the display device that uses the light source device according to a sixth embodiment of the present invention will next be described. FIG. 29 is a sectional view showing the display device of the present embodiment. As shown in FIG. 29, the light source device 15 of the present embodiment differs from the light source device 1 (see FIG. 4) of the aforementioned first embodiment in the use of a black holder 83 that is black and light-absorbent. Other structural aspects of the present embodiment are the same as in the aforementioned first embodiment.

In the present embodiment, since the holder is black and light-absorbent, the light emitted from the end surface of the narrow-angle light-guide plate can be prevented from being scattered by the holder and other components and entering the wide-angle light-guide plate. Excellent directivity can thereby be maintained because the effects of stray light can be reduced when the narrow-angle light source is on. Other aspects of the structure and operation of the light source device 15 of the present embodiment are the same as in the light source device 1 of the first embodiment.

Figure 30:
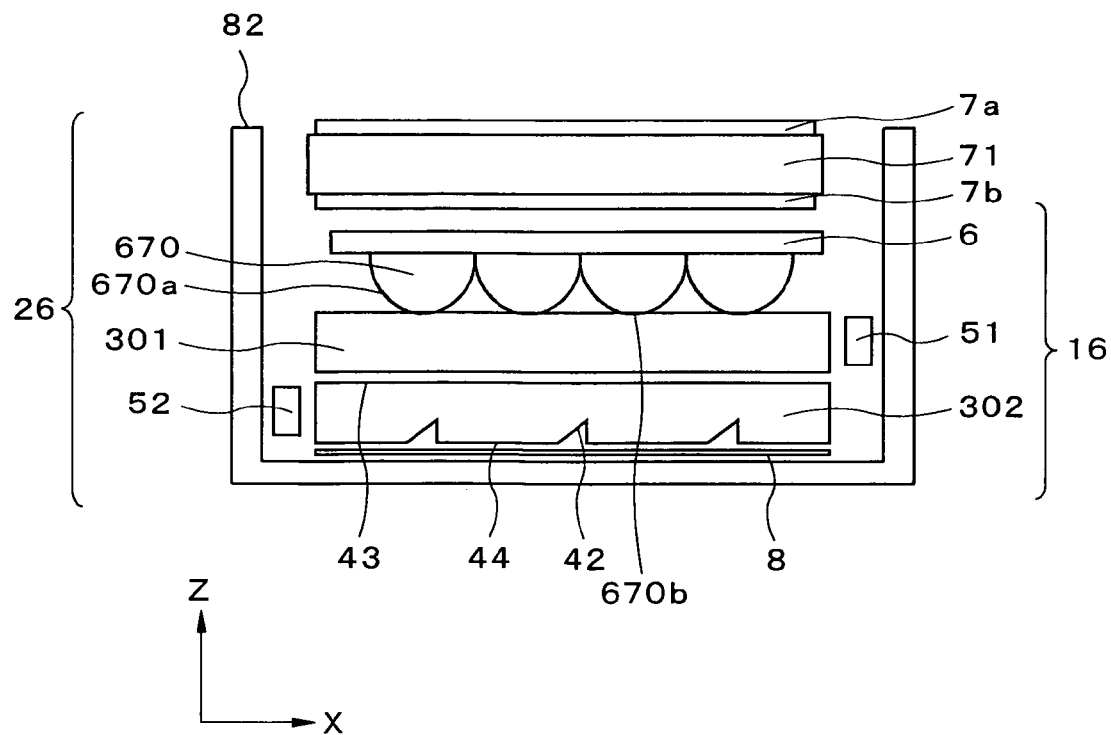
FIG. 30 is a sectional view showing the display device according to a seventh embodiment of the present invention.

The light source device and the display device that uses the light source device according to a seventh embodiment of the present invention will next be described. FIG. 30 is a sectional view showing the display device of the present embodiment. As shown in FIG. 30, the display device 26 of the present embodiment differs from the display device 2 (see FIG. 5) of the aforementioned first embodiment in that the display device 26 has a transmissive liquid crystal panel 71 that uses a low-reflectance polarizing plate 7b as the polarizing plate on at least the −Z side, instead of the transmissive liquid crystal panel 7 having a polarizing plate 7a. Other structural aspects of the present embodiment are the same as in the aforementioned first embodiment.

In the present embodiment, since a low-reflectance polarizing plate 7b is used as the polarizing plate on the −Z side of the transmissive liquid crystal panel 71, it is possible to prevent a portion of the high-directivity light emitted from the light source device 16 when the narrow-angle light source is on from being reflected back towards the light source device 16 by the surface of the polarizing plate on the incidence side of the transmissive liquid crystal panel 71. When light is reflected by the surface of the polarizing plate so as to reenter the light source device 16, this reentering light becomes stray light inside the light source device 16, and the directivity is reduced when the narrow-angle light source is on. In the present embodiment, since reflection in the surface of the polarizing plate can be reduced, and the effects of stray light can be reduced when the narrow-angle light source is on, excellent directivity can be maintained. Other aspects of the structure and operation of the display device 26 of the present embodiment are the same as in the display device 2 of the first embodiment.

Figure 31:
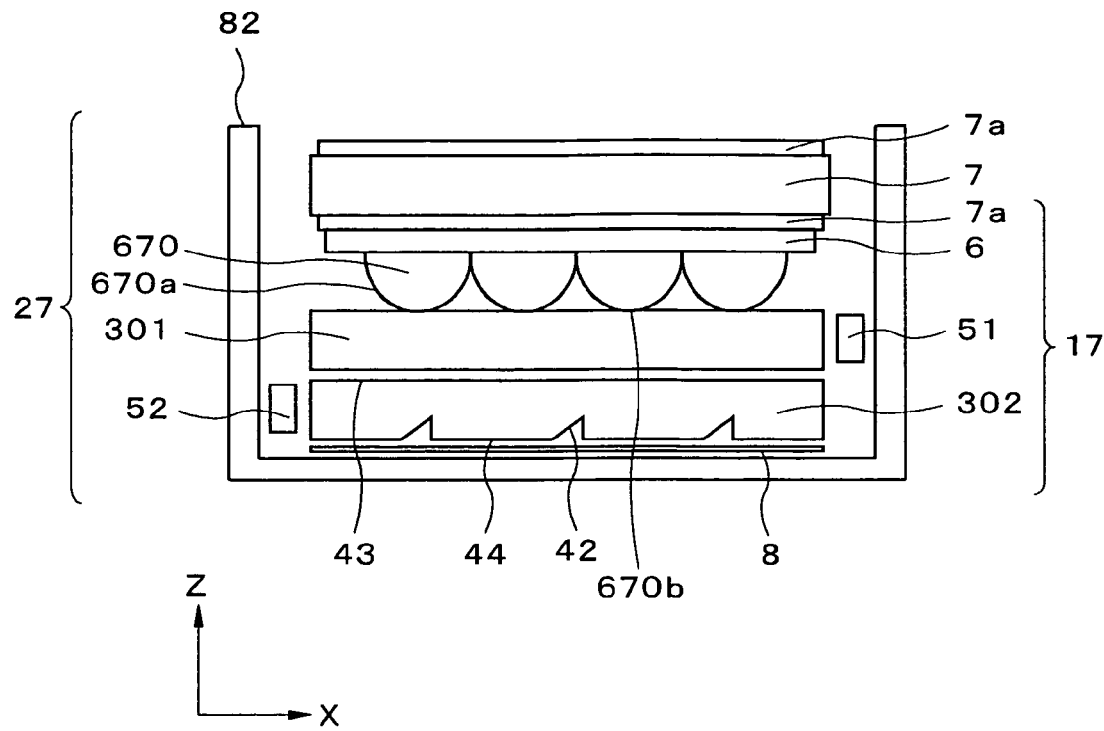
FIG. 31 is a sectional view showing the display device according to an eighth embodiment of the present invention.

The light source device and the display device that uses the light source device according to an eighth embodiment of the present invention will next be described. FIG. 31 is a sectional view showing the display device of the present embodiment. As shown in FIG. 31, the display device 27 of the present embodiment differs from the display device 2 (see FIG. 5) of the aforementioned first embodiment in that the emitted light control sheet 6 and the polarizing plate 7a on the −Z-axis side of the transmissive liquid crystal panel 7 are closely contacted together. Other structural aspects of the present embodiment are the same as in the aforementioned first embodiment.

In the present embodiment, since the emitted light control sheet 6 and the polarizing plate 7a on the −Z-axis side of the transmissive liquid crystal panel 7 are closely contacted together, the effects of surface reflection caused by the surface of the polarizing plate 7a can be reduced, and the occurrence of stray light can be reduced, particularly when the narrow-angle light source is on. Excellent directivity can therefore be maintained. Since there is no need for a low-reflectance treatment on the surface of the polarizing plate 7a, a low-cost polarizing plate can be used. Other aspects of the structure and operation of the display device 27 of the present embodiment are the same as in the display device 2 of the first embodiment.

Figure 32:
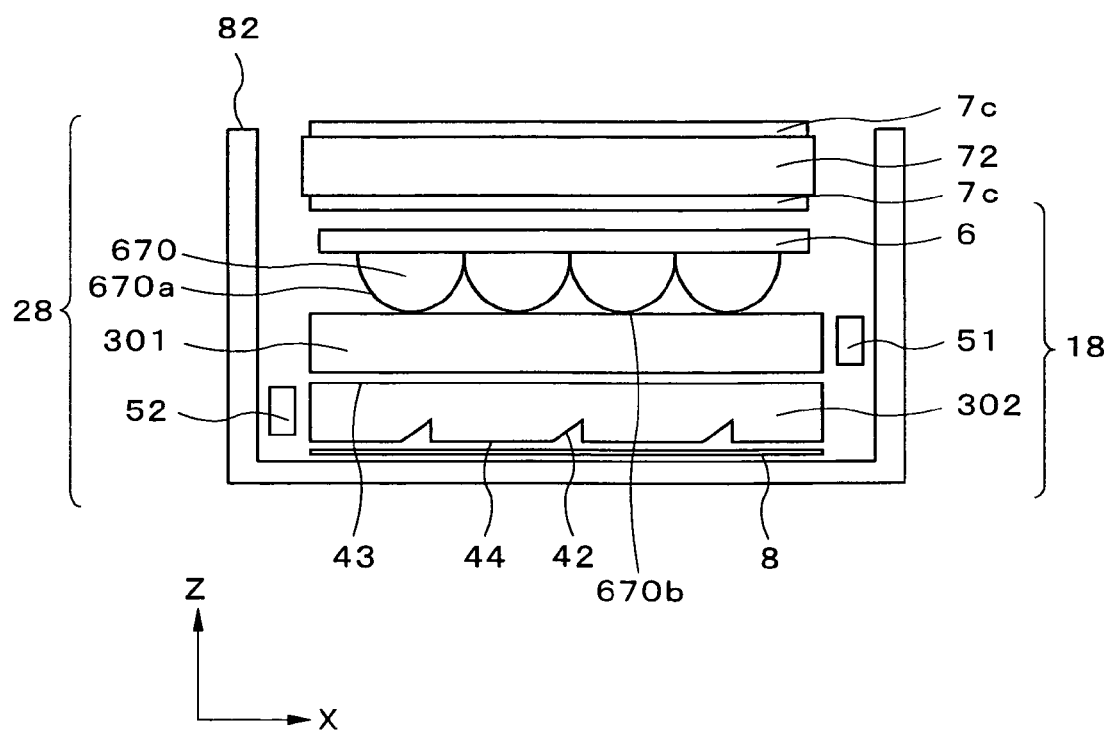
FIG. 32 is a sectional view showing the display device according to a ninth embodiment of the present invention.

The light source device and the display device that uses the light source device according to a ninth embodiment of the present invention will next be described. FIG. 32 is a sectional view showing the display device of the present embodiment. As shown in FIG. 32, the display device 28 of the present embodiment differs from the display device 2 (see FIG. 5) of the aforementioned first embodiment in that the display device 28 has a transmissive liquid crystal panel 72 that uses a circular polarizing plate 7c, instead of the transmissive liquid crystal panel 7 having the polarizing plate 7a. Other structural aspects of the present embodiment are the same as in the aforementioned first embodiment.

In the present embodiment, since a circular polarizing plate 7c is used in the transmissive liquid crystal panel 72, it is possible to minimize the occurrence of a phenomenon in which a portion of the light that is emitted from the light source device 18 and is incident on the transmissive liquid crystal panel 72 is reflected by metal wiring and other components of the transmissive liquid crystal panel so as to reenter the light source device 18. In a transmissive liquid crystal panel that uses an ordinary polarizing plate, light that is emitted from the light source device and is incident on the transmissive liquid crystal panel becomes linearly polarized when the light passes through the polarizing plate on the incident-surface side, i.e., the −Z side. Since this polarized state does not change even when the light is reflected by metal wiring and other reflective structures of the transmissive liquid crystal panel, the light passes through the polarizing plate on the −Z side and reenters the light source device. As previously mentioned, light that reenters the light source device is stray light that reduces the directivity when the narrow-angle light source is on. In contrast, in the transmissive liquid crystal panel 72 that uses the circular polarizing plate 7c, the light that exits from the light source device and enters the transmissive liquid crystal panel 72 becomes circularly polarized upon passing through the circular polarizing plate 7c on the −Z side. When this circularly polarized light is reflected by metal wiring and other reflective structures of the transmissive liquid crystal panel 72, the polarization state is rotated 180 degrees, and the light is circularly polarized in the opposite direction. Since this reversed circularly polarized light is absorbed by the circular polarizing plate 7c on the −Z side, the light that is reflected by the reflective structures of the transmissive liquid crystal panel 72 can be prevented from being emitted towards the light source device 18. This configuration makes it possible to reduce the occurrence of stray light from the reflective structures of the transmissive liquid crystal panel 72, and high directivity can therefore be maintained when the narrow-angle light source is on. The circular polarizing plate 7c of the present embodiment was described as having no particular surface treatment, but superior effects are obtained when the surface reflectance of the polarizing plate is reduced by performing a low-reflectance treatment on the surface of the polarizing plate as described in the seventh embodiment, or by optically contacting the polarizing plate with the emitted light control sheet as described in the eighth embodiment. Furthermore, the present embodiment is effective when an active matrix liquid crystal panel is used that has a large amount of metal wiring and other reflective structures. The present embodiment is also effective particularly when a transflective liquid crystal panel is used that has an internal reflecting panel in each pixel. When the present embodiment is applied in a liquid crystal panel that operates according to a multi-domain vertical alignment mode, it is possible to minimize reductions in transmittance caused by domain division, and the present embodiment is therefore more effective. Other aspects of the structure and operation of the display device 28 of the present embodiment are the same as in the display device 2 of the first embodiment.

What is claimed is:

1. A light source device comprising:
   first and second light sources;
   a first light-guide member on which light from said first light source is incident;
   a second light-guide member on which light from said second light source is incident; and
   an emitted light control sheet on which light emitted from said first and second light-guide members is incident and which internally reflects the light from said first light-guide member, and which refracts the light from said second light-guide member; wherein
   said emitted light control sheet is composed of a transparent material and has a flat plate portion and protrusions formed on a surface of the flat plate portion on the side facing said first light-guide member;
   apexes of said protrusions are closely contacted to said first light-guide member; and
   said second light-guide member is disposed on an opposite side of said first light-guide member in relation to the side on which said emitted light control sheet is mounted.

2. The light source device according to claim 1, wherein said first light-guide member is a parallel flat plate.

3. The light source device according to claim 1, wherein a tilted surface irradiated by light that is incident from said second light source is formed in said second light-guide member.

4. The light source device according to claim 1, wherein a reflecting panel is mounted on a side of said second light-guide member that is opposite a surface to which said first light-guide member is mounted.

5. The light source device according to claim 1, wherein said first light source and said second light source are mounted to side surfaces on the same sides as said first light-guide member and said second light-guide member, respectively.

6. The light source device according to claim 1, wherein an intensity of said first light source is smaller than an intensity of said second light source.

7. The light source device according to claim 1, wherein said first light source is composed of one or a plurality of point light sources;
said second light source is composed of a plurality of point light sources; and
a number of point light sources that constitute said first light source is smaller than a number of point light sources that constitute said second light source.

8. The light source device according to claim 1, wherein said first light source is also on when said second light source is on.

9. The light source device according to claim 1, wherein a size of said first light-guide member is greater than a size of said second light-guide member.

10. The light source device according to claim 1, wherein said protrusion is a shape including a portion of a sphere.

11. The light source device according to claim 1, wherein said first light source is disposed on a first side surface of said first light-guide member; and
a first reflecting panel is mounted to a second side surface of said first light-guide member on an opposite side from the first side surface.

12. The light source device according to claim 11, wherein said first light source is a point light source mounted to a side surface of said first light-guide member; and
a second reflecting panel is mounted outside a region in which the point light source is mounted on the side surface.

13. The light source device according to claim 1, wherein a position of said first light source in relation to said first light-guide member differs from a position of said second light source in relation to said second light-guide member.

14. The light source device according to claim 13, wherein said first light source is mounted to a corner of said first light-guide member.

15. The light source device according to claim 1, wherein an opaque sheet is mounted between said first light-guide member and said second light-guide member.

16. The light source device according to claim 15, wherein said opaque sheet has adhesive properties.

17. The light source device according to claim 1, wherein said light source device is housed in a holder, and the holder has light-absorbing properties.

18. The light source device according to claim 17, wherein said holder is black.

19. The light source device according to claim 1, wherein three imaginary straight lines that connect apexes of said protrusions extends in three different directions that are parallel to a surface of said flat plate portion.

20. The light source device according to claim 19, wherein the three imaginary straight line that connects apexes of said protrusions forms an equilateral triangle.

21. The light source device according to claim 19, wherein a diffusion pattern for diffusing transmitted light is formed on a surface opposite from the side on which said protrusions are formed in said flat plate portion of said emitted light control sheet.

22. A display device comprising;
the light source device according to claim 1; and
a transmissive display panel for transmitting light emitted from the light source device, whereby
an image is associated with the light.

23. The display device according to claim 22, wherein said transmissive display panel and the emitted light control sheet of said light source device are closely contacted together.

24. A terminal device comprising the display device according to claim 22.

25. The terminal device according to claim 24, comprising an intensity adjustment unit for adjusting intensities of said first and second light sources independently from each other.

26. The terminal device according to claim 24, comprising:
a power storage unit for supplying electrical power to at least said first and second light sources;
a residual power detection unit for detecting electrical power remaining in the power storage unit; and
a control unit for controlling a light intensity of said first and second light sources based on results of detection by the residual power detection unit; wherein
said control unit turns on only said first light source when the remaining electrical power detected by said residual power detection unit is less than a prescribed value.

27. The terminal device according to claim 24, comprising:
an input detection unit for detecting an input operation;
a timer for measuring a specific time; and
a control unit for controlling a light intensity of said first and second light sources; wherein
said control unit turns on only said first light source when said input detection unit has not detected an input operation during said specific time measured by said timer.

28. The terminal device according to claim 24, wherein the device is a mobile phone, a personal information terminal, a gaming device, a digital camera, a video camera, a video player, a notebook-type personal computer, a cash dispenser, or a vending machine.

29. The terminal device according to claim 28, comprising a mobile telephone wherein said first and second light sources are disposed on the top side and/or bottom side of a display screen.

30. The display device according to claim 22, wherein said transmissive display panel is a transmissive liquid crystal panel.

31. The display device according to claim 30, wherein said transmissive liquid crystal panel is a horizontal field mode, multi-domain vertical alignment mode, or film-compensated TN mode liquid crystal panel.

32. The display device according to claim 31, wherein said transmissive liquid crystal panel has a polarizing plate on at least a surface facing said light source device; and
the polarizing plate is a low-reflectance polarizing plate whose surface is treated to reduce reflectance.

33. The display device according to claim 31, wherein said transmissive liquid crystal panel has a polarizing plate on at least a surface facing said light source device; and
the polarizing plate is a circular polarizing plate.

34. The display device according to claim 33, wherein said transmissive liquid crystal panel is an active matrix-type transmissive liquid crystal panel.

35. The display device according to claim 34, wherein said transmissive liquid crystal panel is a transflective liquid crystal panel having a reflective region in a pixel electrode.

* * * * *